US011887548B2

(12) United States Patent
Hong

(10) Patent No.: US 11,887,548 B2
(45) Date of Patent: Jan. 30, 2024

(54) GATE DRIVER AND DISPLAY DEVICE INCLUDING THE SAME

(71) Applicant: LG DISPLAY CO., LTD., Seoul (KR)

(72) Inventor: Ye Won Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/952,417

(22) Filed: Sep. 26, 2022

(65) Prior Publication Data

US 2023/0105266 A1 Apr. 6, 2023

(30) Foreign Application Priority Data

Sep. 27, 2021 (KR) ........................ 10-2021-0127134
Dec. 17, 2021 (KR) ........................ 10-2021-0181988

(51) Int. Cl.

*G09G 3/3266* (2016.01)
*G09G 3/3233* (2016.01)
*G09G 3/3275* (2016.01)

(52) U.S. Cl.

CPC ......... *G09G 3/3266* (2013.01); *G09G 3/3233* (2013.01); *G09G 3/3275* (2013.01); *G09G 2300/0814* (2013.01); *G09G 2300/0819* (2013.01); *G09G 2300/0842* (2013.01); *G09G 2310/0286* (2013.01); *G09G 2310/0291* (2013.01); *G09G 2310/0297* (2013.01); *G09G 2310/08* (2013.01); *G09G 2320/043* (2013.01); *G09G 2330/021* (2013.01)

(58) Field of Classification Search

CPC ...... G09G 3/20; G09G 3/3233; G09G 3/3275; G09G 3/3266

See application file for complete search history.

(56) References Cited

U.S. PATENT DOCUMENTS

2014/0023173 A1 1/2014 Miyake
2019/0251921 A1* 8/2019 Ono .................... G11C 19/184
2020/0066211 A1* 2/2020 Lee ...................... G09G 3/3225
2022/0148513 A1 5/2022 Kim

FOREIGN PATENT DOCUMENTS

KR 10-2018-0072041 A 6/2018
KR 10-2021-0008895 A 1/2021
KR 10-2021-0025154 A 3/2021

* cited by examiner

*Primary Examiner* — Matthew A Eason
*Assistant Examiner* — Scott D Au
(74) *Attorney, Agent, or Firm* — Morgan, Lewis & Bockius LLP

(57) ABSTRACT

A gate driver includes signal transmission units cascade-connected via a carry line to which a carry signal is applied from a previous signal transmission unit. An nth signal transmission unit includes: a first circuit including a first Q logic generator to receive the carry signal from the previous signal transmission unit to charge a first control node, and a second Q logic generator to discharge the first control node; a second circuit to discharge a second control node according to a first control node voltage; and an output to output the carry signal and a gate signal based on potentials of the first and second control nodes. The second Q logic generator includes: a second-1 transistor and a second-2 transistor each respectively having a first electrode, a gate electrode, a back gate electrode, and a second electrode.

23 Claims, 15 Drawing Sheets

GATE DRIVER AND DISPLAY DEVICE INCLUDING THE SAME

CROSS-REFERENCE TO RELATED APPLICATION

This application claims priority to and the benefit of Korean Patent Application No. 10-2021-0127134, filed on Sep. 27, 2021, and Korean Patent Application No. 10-2021-0181988, filed on Dec. 17, 2021, the disclosure of which is incorporated herein by reference in its entirety.

BACKGROUND

1. Technical Field

The present disclosure relates to a gate driver and a display device including the same.

2. Discussion of the Related Art

Display devices includes a liquid crystal display (LCD) device, an electroluminescence display device, a field emission display (FED) device, a plasma display panel (PDP), and the like.

Electroluminescent display devices are divided into inorganic light emitting display devices and organic light emitting display devices according to a material of a light emitting layer. An active-matrix type organic light emitting display device reproduces an input image using a self-emissive element which emits light by itself, for example, an organic light emitting diode (hereinafter referred to as an "OLED"). An organic light emitting display device has advantages in that a response speed is fast and luminous efficiency, luminance, and a viewing angle are large.

Some of display devices, for example, a liquid crystal display device or an organic light emitting display device includes a display panel including a plurality of sub-pixels, a driver outputting a driving signal for driving the display panel, a power supply generating power to be supplied to the display panel or the driver, and the like. The driver includes a gate driver that supplies a scan signal or a gate signal to the display panel, and a data driver that supplies a data signal to the display panel.

In such a display device, when a driving signal such as a scan signal, an EM signal, and a data signal is supplied to a plurality of sub-pixels formed in the display panel, the selected sub-pixel transmits light or emits light directly to thereby display an image.

In this case, there is a case in that a transistor for improving discharge characteristics is added to the gate driver. However, since a bezel can increase due to addition of the transistor, and the added transistor operates at Vgs=0V in an off section, a leakage current is generated, and accordingly, power consumption can increase and output degradation of a gate signal can be caused.

SUMMARY

Accordingly, embodiments of the present disclosure are directed to a gate driver and a display device including the same that substantially obviate one or more of the problems due to limitations and disadvantages of the related art.

An aspect of the present disclosure is to provide a gate driver capable of reducing a leakage current while reducing the number of transistors and a display device including the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a gate driver comprises a plurality of signal transmission units cascade-connected via a carry line to which a carry signal is applied from a previous signal transmission unit, wherein an nth (n is a positive integer) signal transmission unit includes: a first circuit unit including a first Q logic generator configured to receive the carry signal from the previous signal transmission unit to charge a first control node, and a second Q logic generator configured to discharge the first control node; a second circuit unit configured to discharge a second control node according to a voltage of the first control node; and an output unit configured to output the carry signal and a gate signal based on potentials of the first control node and the second control node, wherein the second Q logic generator includes: a second-1 transistor having a first electrode connected to the first control node, a gate electrode connected to the second control node, a back gate electrode receiving the carry signal from a next signal transmission unit, and a second electrode connected to a buffer node; and a second-2 transistor having a first electrode connected to the buffer node, a gate electrode connected to the second control node, a back gate electrode receiving the carry signal from the next signal transmission unit, and a second electrode connected to a low potential voltage line.

In another aspect, a gate driver comprises a plurality of signal transmission units cascade-connected via a carry line to which a carry signal is applied from a previous signal transmission unit, wherein an nth (n is a positive integer) signal transmission unit includes: a circuit unit configured to receive the carry signal from the previous signal transmission unit to charge or discharge voltages of a first control node and a second control node; and an output unit configured to output a gate signal and the carry signal based on potentials of the first control node and the second control node, wherein the output unit includes: a first pull-up transistor having a first electrode connected to a first high potential voltage line, a gate electrode connected to the first control node, and a second electrode connected to a first output node; a first pull-down transistor having a first electrode connected to the first output node, a gate electrode connected to the second control node, a back gate electrode receiving the carry signal from a next signal transmission unit, and a second electrode connected to a first low potential voltage line; a second pull-up transistor having a first electrode connected to a second high potential voltage line, a gate electrode connected to the first control node, and a second electrode connected to a second output node; and a second pull-down transistor having a first electrode connected to the second output node, a gate electrode connected to the second control node, a back gate electrode receiving the carry signal from the next signal transmission unit, and a second electrode connected to a second low potential voltage line.

In another aspect, a display device comprises a display panel on which a plurality of data lines, a plurality of gate lines crossing the data lines, a plurality of power lines to which different constant voltages are applied, and a plurality of sub-pixels are disposed; a data driver configured to supply a data voltage of pixel data to the data lines; and a gate driver configured to supply a gate signal to the gate lines, wherein the gate driver includes a plurality of signal transmission units cascade-connected via a carry line to which a carry signal is applied from a previous signal transmission unit, an nth (n is a positive integer) signal transmission unit includes: a first circuit unit including a first Q logic generator configured to receive the carry signal from the previous signal transmission unit to charge a first control node, and a second Q logic generator configured to discharge the first control node; a second circuit unit configured to discharge a second control node according to a voltage of the first control node; and an output unit configured to output the carry signal and a gate signal based on potentials of the first control node and the second control node, and the second Q logic generator includes: a second-1 transistor having a first electrode connected to the first control node, a gate electrode connected to the second control node, a back gate electrode receiving the carry signal from a next signal transmission unit, and a second electrode connected to a buffer node; and a second-2 transistor having a first electrode connected to the buffer node, a gate electrode connected to the second control node, a back gate electrode receiving the carry signal from the next signal transmission unit, and a second electrode connected to a low potential voltage line.

In another aspect, a display device comprises a display panel on which a plurality of data lines, a plurality of gate lines crossing the data lines, a plurality of power lines to which different constant voltages are applied, and a plurality of sub-pixels are disposed; a data driver configured to supply a data voltage of pixel data to the data lines; and a gate driver configured to supply a gate signal to the gate lines, wherein the gate driver includes a plurality of signal transmission units cascade-connected via a carry line to which a carry signal is applied from a previous signal transmission unit, an nth (n is a positive integer) signal transmission unit includes: a circuit unit configured to receive the carry signal from the previous signal transmission unit to charge or discharge voltages of a first control node and a second control node; and an output unit configured to output a gate signal and the carry signal based on potentials of the first control node and the second control node, and the output unit includes: a first pull-up transistor having a first electrode connected to a first high potential voltage line, a gate electrode connected to the first control node, and a second electrode connected to a first output node; a first pull-down transistor having a first electrode connected to the first output node, a gate electrode connected to the second control node, a back gate electrode receiving the carry signal from a next signal transmission unit, and a second electrode connected to a first low potential voltage line; a second pull-up transistor having a first electrode connected to a second high potential voltage line, a gate electrode connected to the first control node, and a second electrode connected to a second output node; and a second pull-down transistor having a first electrode connected to the second output node, a gate electrode connected to the second control node, a back gate electrode receiving the carry signal from the next signal transmission unit, and a second electrode connected to a second low potential voltage line.

In the present disclosure, since transistors which control discharging of a gate driver are configured in a double-gate structure, and a negative bias is applied to a back gate electrode when the transistors in the double-gate structure are turned off, a leakage current can be reduced while reducing the number of transistors.

In the present disclosure, power consumption and output characteristics can be improved by reducing the leakage current.

In the present disclosure, since a separate transistor for improving discharging characteristics is not necessary, not only a path where the leakage current can be generated can decrease but also a bezel size can be reduced.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
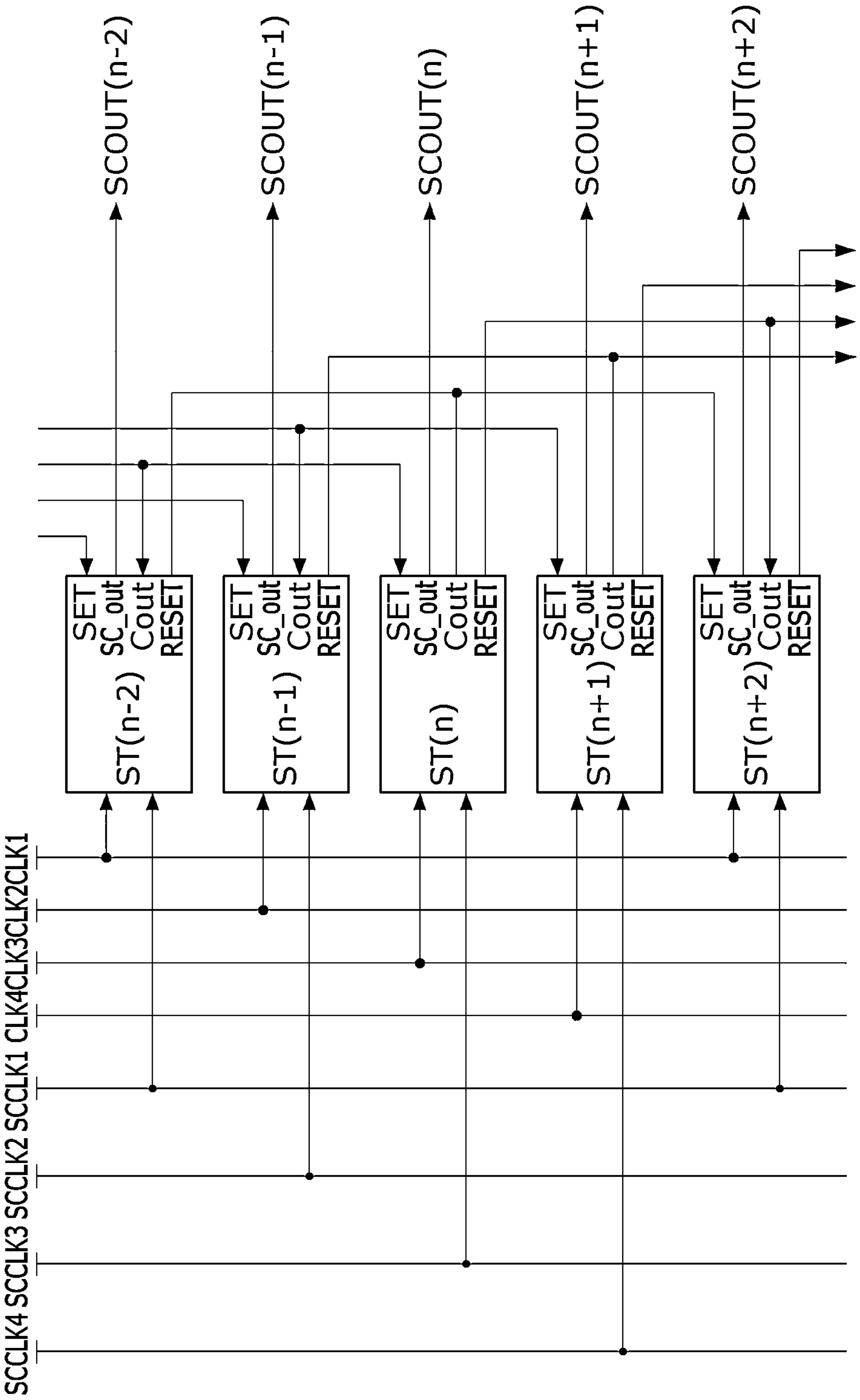
FIG. 1 is a view schematically illustrating a shift register of a gate driver according to a first embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," and "having," used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

FIG. 1 is a view schematically illustrating a shift register of a gate driver according to a first embodiment of the present disclosure.

Referring to FIG. 1, the gate driver according to the first embodiment includes a shift register synchronized with a shift clock CLK to sequentially output pulses of a gate signal (hereinafter, referred to as "gate pulses") SCOUT(n−2) to SCOUT(n+2). "SET" in FIG. 1 represents a set terminal, and "RESET" in FIG. 1 represents a reset terminal.

The shift register includes a plurality of signal transmission units ST(n−2), ST(n−1), ST(n), ST(n+1), and ST(n+2) cascade-connected via a carry line to which a carry signal is transmitted.

A timing controller may adjust a width and a multi-output of an output signal SCOUT of the gate driver using a start pulse VST input to the gate driver.

Figure 2:
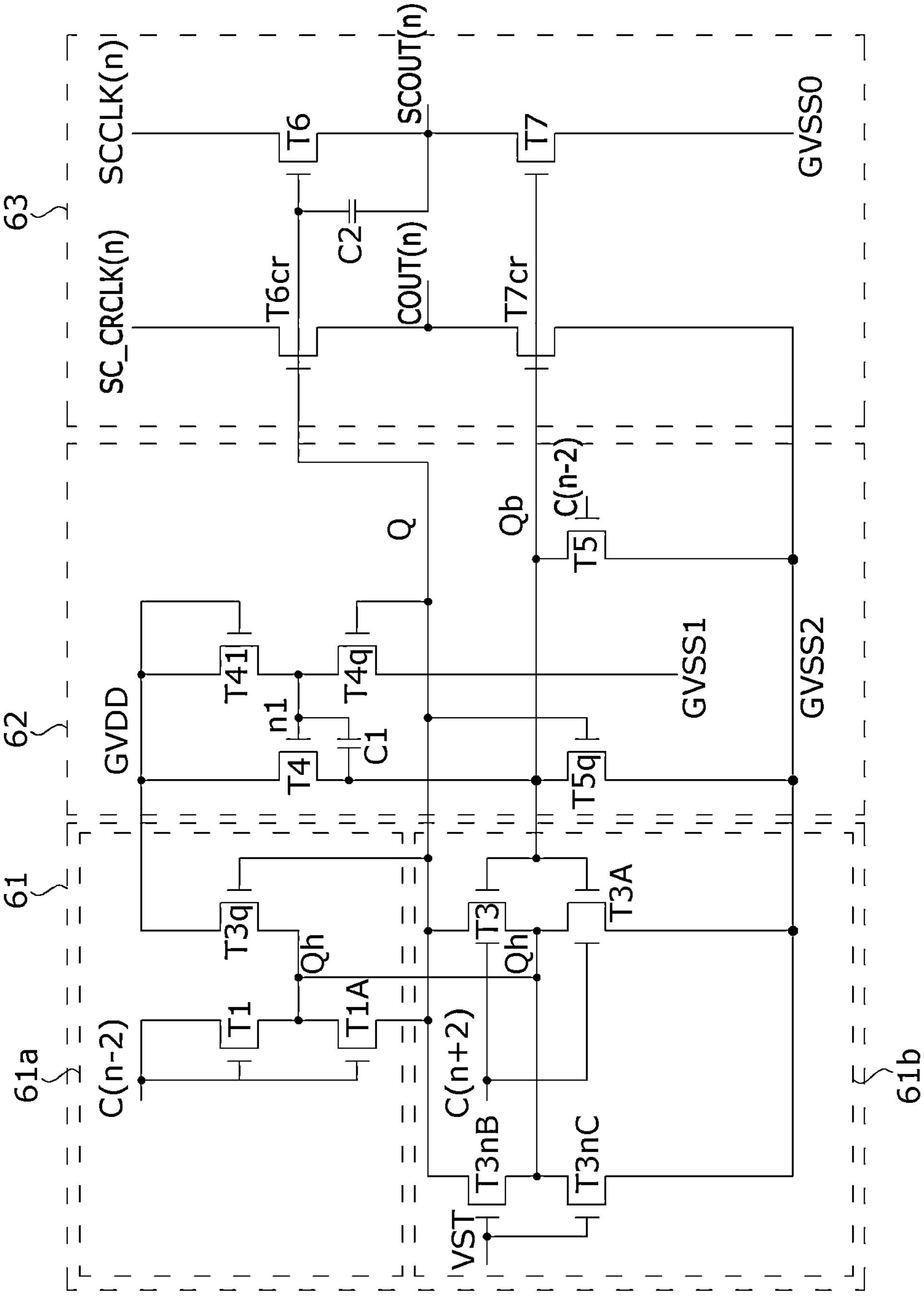
FIG. 2 is a view illustrating the gate driver according to the first embodiment of the present disclosure.

A start signal VST is generally input to a first signal transmission unit. In FIG. 2, an n−2th signal transmission unit ST(n−2) may be the first signal transmission unit receiving the start signal VST.

The signal transmission units ST(n−2), ST(n−1), ST(n), ST(n+1), and ST(n+2) respectively receive a start pulse or carry signals Cout(n−2), Cout(n−1), Cout(n), Cout(n+1), and Cout(n+2) output from a previous signal transmission unit, and receive the shift clock CLK. A first signal transmission unit ST(n−2) starts to be driven according to the start pulse VST, and the other signal transmission units, ST(n−1), ST(n), ST(n+1), and ST(n+2) respectively receive the carry signals Cout(n−2), Cout(n−1), Cout(n), and Cout (n+1) from the previous signal transmission unit and start to be driven. The shift clock CLK may be N (N is a positive integer greater than or equal to 2) phase clock. For example, the shift clock CLK may be four-phase clocks CLK1, CLK2, CLK3, and CLK4. The phase difference between the four-phase clocks CLK1, CLK2, CLK3, and CLK4 may be 90 degrees.

The signal transmission units ST(n−2) to ST(n+2) may output a carry signal Cout through second output nodes while outputting scan pulses SCOUT(n−2) to SCOUT(n+2) through first output nodes, respectively.

Figure 3:
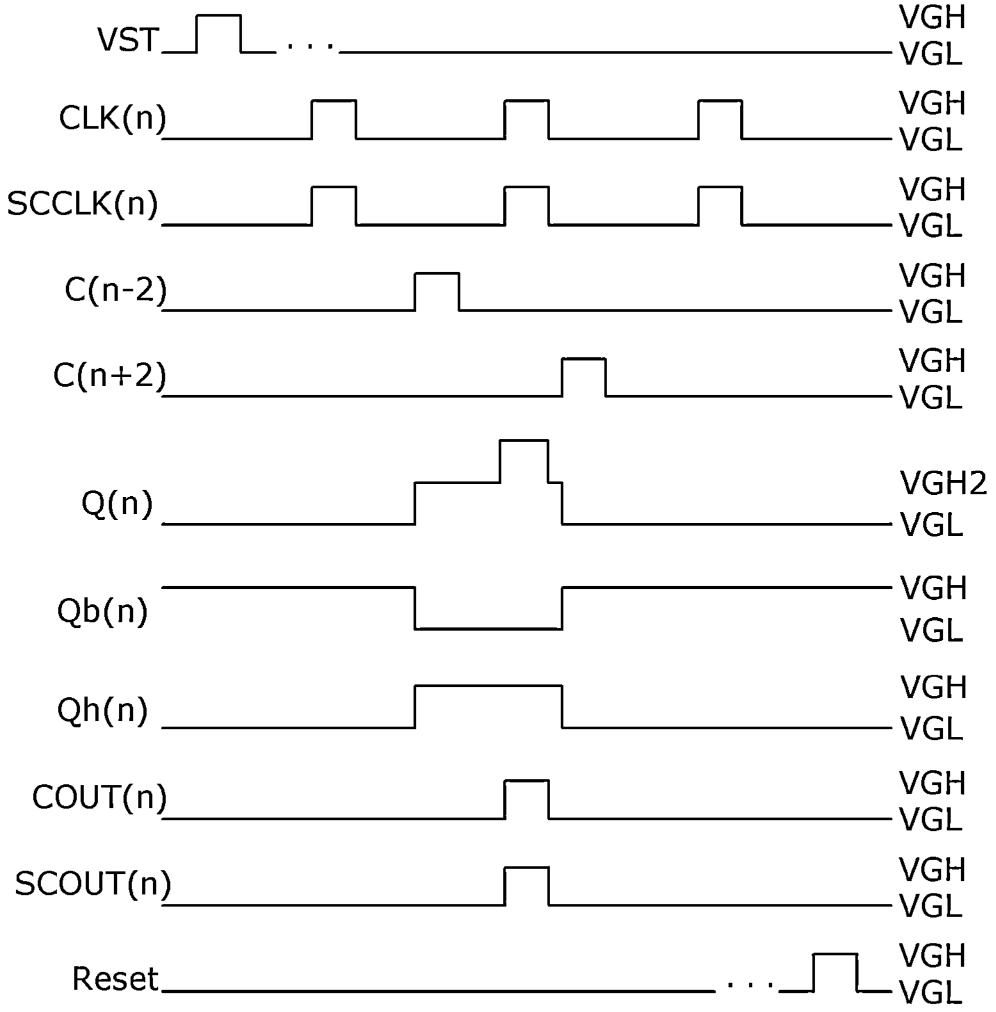
FIG. 3 is a waveform diagram illustrating input/output signals and voltages of control nodes of the gate driver shown in FIG. 2.

FIG. 2 is a view illustrating the gate driver according to the first embodiment of the present disclosure, and FIG. 3 is a waveform diagram illustrating input/output signals and voltages of control nodes of the gate driver shown in FIG. 2. Here, an example in which the gate driver is implemented as a scan driver will be described.

Referring to FIG. 2, the scan driver according to the embodiment may include a first control node that pulls up an output voltage (hereinafter referred to as a "Q node"), a second control node that pulls down the output voltage (hereinafter referred to as a "Qb node"), a first circuit unit 61, a second circuit unit 62, and an output unit 63.

The first circuit unit 61 may include a first Q logic generator 61*a* and a second Q logic generator 61*b*. The first Q logic generator 61*a* charges the Q node Q, and the second Q logic generator 61*b* discharges the first control node.

The first Q logic generator 61*a* includes a first-1 transistor T1, a first-2 transistor T1A, and a first-3 transistor T3*q*.

The first-1 transistor T1 is turned on by an N−2th carry signal C(n−2) from the previous signal transmission unit and supplies a voltage of the N−2th carry signal C(n−2) to a buffer node Qh. The first-1 transistor T1 includes a first electrode and a gate electrode receiving the N−2th carry signal from the previous signal transmission unit, and a second electrode connected to a buffer node.

The first-2 transistor T1A is turned on by the N−2th carry signal C(n−2) and charges the Q node Q based on the N−2th carry signal. The first-2 transistor T1A includes a first electrode connected to the second electrode of the first-1 transistor T1 or the buffer node Qh, a gate electrode connected to the N−2th carry signal C(n−2), and a second electrode connected to the Q node Q.

The first-3 transistor T3*q* is turned on by the Q node Q and transmits a high potential voltage of a high potential voltage line GVDD to the buffer node Qh. The first-3 transistor T3*q* includes a first electrode connected to the high potential voltage line GVDD, a gate electrode connected to the Q node Q, and a second electrode connected to the buffer node Qh.

The second Q logic generator 61*b* includes a second-1 transistor T3, a second-2 transistor T3A, a second-3 transistor T3*n*B, and a second-4 transistor T3*n*C. The second-1 transistor T3 is turned on by the Qb node Qb, and discharges the Q node Q to a third low potential voltage of a third low potential voltage line GVSS2 together with the second-2 transistor T3A.

When the second-1 transistor T3 is turned off by the Qb node Qb, a negative bias is applied to a back gate electrode by an N+2th carry signal C(n+2) from the next signal transmission unit. Accordingly, a threshold voltage Vth of the second-1 transistor T3 may increase and thus a leakage current may be reduced. The second-1 transistor T3 includes a first electrode connected to a first control node Q, a gate electrode connected to a second control node Qb, a back gate electrode to which the N+2th carry signal C(n+2) is applied, and a second electrode connected to a first electrode of the second-2 transistor T3A.

The second-2 transistor T3A is turned on by the second control node Qb, and discharges the first control node Q to a third low potential voltage of the third low potential voltage line GVSS2 together with the second-1 transistor T3.

When the second-2 transistor T3A is turned off by the Qb node Qb, the negative bias is applied to the back gate electrode by the N+2th carry signal C(n+2) from the next signal transmission unit. Accordingly, a threshold voltage Vth of the second-2 transistor T3A may increase and thus the leakage current may be reduced. The second-2 transistor T3A includes the first electrode connected to the second electrode of the second-1 transistor T3, a gate electrode connected to the Qb node Qb, a back gate electrode to which the N+2th carry signal C(n+2) is applied, and a second electrode connected to the third low potential voltage line GVSS2.

The second-3 transistor T3*n*B is turned on by the start pulse VST, and discharges the Q node Q to the third low potential voltage of the third low potential voltage line GVSS2 together with the second-4 transistor T3*n*C. The second-3 transistor T3*n*B includes a first electrode connected to the Q node Q, a gate electrode to which the start pulse VST is applied, and a second electrode connected to a first electrode of the second-4 transistor T3*n*C.

The second-4 transistor T3*n*C is turned on by the start pulse VST, and discharges the first control node Q to the second low potential voltage of the third low potential voltage line GVSS2 together with the second-3 transistor T3*n*B. The second-4 transistor T3*n*C includes the first electrode connected to the second electrode of the second-3 transistor T3*n*B, a gate electrode to which the start pulse VST is applied, and a second electrode connected to the third low potential voltage line GVSS2.

The second circuit unit 62 includes a third-1 transistor T4, a third-2 transistor T41, a third-3 transistor T4*q*, a third-4 transistor T5*q*, and a third-5 transistor T5.

The third-1 transistor T4 is turned on by a voltage of a first node n1, and supplies the high potential voltage to the Qb node Qb. The third-1 transistor T4 includes a first electrode connected to the high potential voltage line to which the high potential voltage is applied, a gate electrode connected to the first node n1, and a second electrode connected to the second control node. The first capacitor C1 is connected between the gate electrode and the second electrode of the fourth transistor T4.

The third-2 transistor T41 is turned on by the high potential voltage, and supplies the high potential voltage to the first node n1. The third-2 transistor T41 includes a first electrode and a gate electrode connected to the high potential voltage line, and a second electrode connected to the first node n1.

The third-3 transistor T4*q* is turned on by a voltage of the Q node Q, and discharges the first node n1 to a second low potential voltage. The third-3 transistor T4*q* includes a first electrode connected to the first node n1, a gate electrode connected to the Q node, and a second electrode connected to a second low potential voltage line GVSS1.

The third-4 transistor T5*q* is turned on by the voltage of the Q node Q, and discharges the Qb node Qb to a third low potential voltage. The third-4 transistor T5*q* includes a first electrode connected to the Qb node Qb, a gate electrode connected to the Q node Q, and a second electrode connected to the third low potential voltage line GVSS2.

The third-5 transistor T5 is turned on by the voltage of the carry signal C(n−2) from the previous signal transmission unit, and discharges the Qb node Qb to the third low potential voltage. The third-5 transistor T5 includes a first electrode connected to the Qb node Qb, a gate electrode to which the carry signal C(n−2) is applied from the previous signal transmission unit, and a second electrode connected to the third low potential voltage line GVSS2.

The output unit 63 may output the scan signal SCOUT(n) to the first output node, and output a carry signal COUT(n) to the second output node based on potentials of the Q node Q and the Qb node Qb. The output unit 63 may include a first pull-up transistor T6, a first pull-down transistor T7, a second pull-up transistor T6*cr*, and a second pull-down transistor T7*cr*.

The first pull-up transistor T6 and the first pull-down transistor T7 charge and discharge the first output node according to the voltages of the Q node Q and the Qb node Qb to output the scan signal SCOUT(n). The first pull-up transistor T6 includes a gate electrode connected to the Q node Q, a first electrode to which a clock signal SCCLK(n) is applied, and a second electrode connected to the first output node. The second capacitor C2 is connected between the gate electrode and the second electrode of the first pull-up transistor T6. The first pull-down transistor T7 is connected to the first pull-up transistor T6 with the first output node therebetween. The first pull-down transistor T7 includes a gate electrode connected to the Qb node Qb, a first electrode connected to the first output node, and a second electrode connected to a first low potential voltage line GVSS0.

The second pull-up transistor T6*cr* and the second pull-down transistor T7*cr* charge and discharge the second output node according to the voltages of the Q node Q and the Qb node Qb to output the carry signal COUT(n). The second pull-up transistor T6*cr* includes a gate electrode connected to the Q node Q, a first electrode to which a clock signal SC_CRCLK(n) is applied, and a second electrode connected to the second output node. The second pull-down transistor T7*cr* is connected to the second pull-up transistor T6*cr* with the second output node therebetween. The second pull-down transistor T7*cr* includes a gate electrode connected to the Qb node Qb, a first electrode connected to the second output node, and a second electrode connected to the third low potential voltage line GVSS2.

A structural advantage of the second Q logic generator applied to the scan driver according to the embodiment will be described.

Figure 4A:
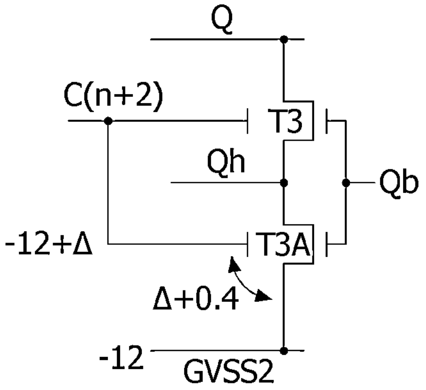
FIGS. 4A to 4C are views for comparatively describing a leakage current reduction principle of a second Q logic generator.
Figure 4B:
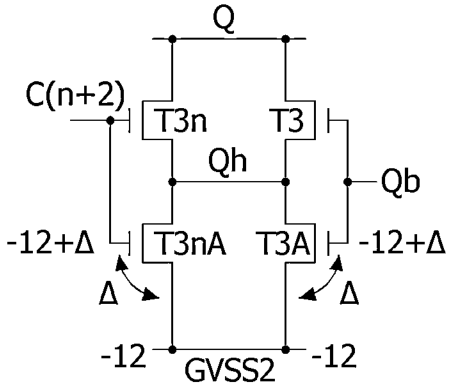
Figure 4C:
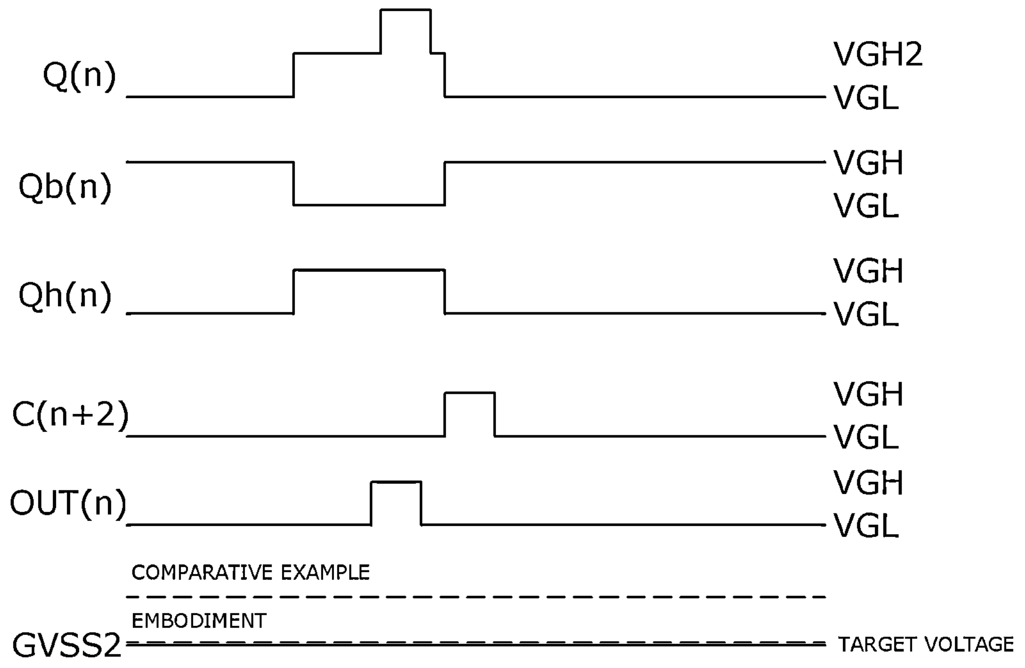

FIGS. 4A to 4C are views for comparatively describing a leakage current reduction principle of the second Q logic generator.

Referring to FIG. 4A, the second-1 transistor T3 and the second-2 transistor T3A of the second Q logic generator according to the embodiment are implemented in a double-gate structure using an LS metal layer, which is a light blocking layer of a coplanar element, as a back gate electrode to receive the negative bias, that is, the carry signal C(n+2) of a gate low voltage, from a next signal transmission unit to the back gate electrode while being turned off as the Qb node Qb is discharged, and the threshold voltage Vth increases due to the negative bias, and accordingly, the leakage current is reduced.

As shown in FIG. 4B, a circuit for comparison with the second Q logic generator of the embodiment is additionally configured of a second-1b transistor T3*n* and a second-2b transistor T3*n*A for improving discharging characteristics in addition to the second-1 transistor T3 and the second-2 transistor T3A, and thus even when the second-1 transistor T3, the second-1b transistor T3*n*, the second-2 transistor T3A, and the second-2b transistor T3*n*A are turned off as the Qb node Qb is discharged, since a gate-source voltage Vgs of each of the second-2 transistor T3A and the second-2b transistor T3*n*A becomes smaller than 0 when the threshold voltage Vth is shifted to a negative polarity and thus the Vth is smaller than 0, the leakage current is generated in the low potential voltage line GVSS2, and accordingly, power consumption increases.

In this case, in the circuit of the comparative example, the leakage current is generated as much as a threshold voltage, that is, Vth(Δ), but in the circuit of the embodiment, the leakage current is generated as much as Vth×0.42, and thus is reduced. The leakage current generated in the circuit of the embodiment is reduced due to an effect of the double-gate structure, and is reduced in proportion to a capacitance ratio (0.42) of an upper gate and a lower gate. The capacitance ratio of the upper gate and the lower gate may vary according to various design parameters such as a length, a thickness, a width, and the like of each of the upper gate and lower gate.

In this case, the leakage current is reduced in proportion to the capacitance ratio of the upper gate and lower gate, and thus it may be effective only when a capacitance of the upper gate is smaller than a capacitance of the bottom gate.

In the embodiment, by applying signals applied to the second-1b transistor T3*n* and the second-2b transistor T3*n*A of the comparative example to the back gate electrodes of the second-1 transistor T3 and the second-2 transistor T3A, the second-1 transistor T3 and the second-2 transistor T3A are configured to also serve as the second-1b transistor T3*n* and the second-2b transistor T3*n*A.

In the circuit of the embodiment in FIG. 4A, since the transistors T3*n* and T3*n*A are removed compared to the circuit of the comparative example in FIG. 4B, a leakage current generation path may decrease and a bezel size is reduced as much as the decrease. In this case, the circuit of the embodiment requires a size increase of the transistor to maintain a falling characteristic the same as that of the circuit of the comparative example, but an amount of leakage current is reduced, and thus there is an advantage in improving power consumption and improving an output.

As shown in FIG. 4C, when the Vth is −2 V, since the leakage current is generated in the low potential voltage line GVSS2, a difference between a target voltage of the low potential voltage line in the circuit of the comparative example and an actual voltage occurs. On the other hand, there is no difference between the target voltage of the low potential voltage line in the circuit of the embodiment and the actual voltage.

That is, it can be seen that the power consumption is improved and the output is stabilized in the circuit of the embodiment.

Figure 5:
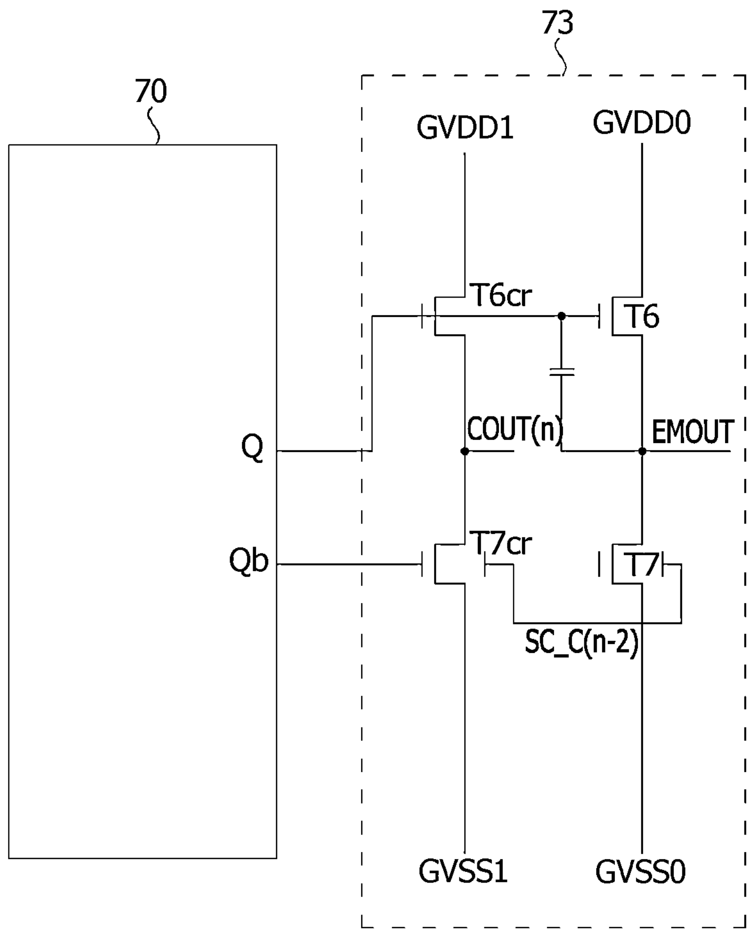
FIG. 5 is a view illustrating a gate driver according to a second embodiment of the present disclosure.

FIG. 5 is a view illustrating a gate driver according to a second embodiment of the present disclosure.

Referring to FIG. 5, the gate driver according to the second embodiment may include a first control node (hereinafter referred to as a "Q node"), a second control node (hereinafter referred to as a "Qb node"), a circuit unit 70, and an output unit 73.

The circuit unit 70 may receive a carry signal from a previous signal transmission unit to charge or discharge voltages of the first control node and the second control node.

The output unit 73 may output an emission control signal EMOUT to a first output node, and output a carry signal COUT(n) to a second output node based on potentials of the Q node Q and the Qb node Qb. The output unit 73 may include a first pull-up transistor T6, a first pull-down transistor T7, a second pull-up transistor T6*cr*, and a second pull-down transistor T7*cr*.

The first pull-up transistor T6 and the first pull-down transistor T7 charge and discharge the first output node according to the voltages of the Q node Q and the Qb node Qb to output the emission control signal EMOUT. The first pull-up transistor T6 includes a gate electrode connected to the Q node Q, a first electrode connected to a first high potential voltage line GVDD0 to which a first high potential voltage is applied, and a second electrode connected to the first output node. The first pull-down transistor T7 is connected to the first pull-up transistor T6 with the first output node therebetween. The first pull-down transistor T7 includes a gate electrode connected to the second control node Qb, a first electrode connected to the first output node, and a second electrode connected to a first low potential voltage line GVSS0 to which a first low potential voltage is applied.

The second pull-up transistor T6*cr* and the second pull-down transistor T7*cr* charge and discharge the second output node according to the voltages of the Q node Q and the Qb node Qb to output the carry signal COUT(n). The second pull-up transistor T6*cr* includes a gate electrode connected to the Q node Q, a first electrode connected to a second high potential voltage line GVDD1 to which a second high potential voltage is applied, and a second electrode connected to the second output node. The second pull-down transistor T7*cr* is connected to the second pull-up transistor T6*cr* with the second output node therebetween. The second pull-down transistor T7*cr* includes a gate electrode connected to the Qb node Qb, a first electrode connected to the second output node, and a second electrode connected to a second low potential voltage line GVSS1 to which a second low potential voltage is applied.

Figure 6:
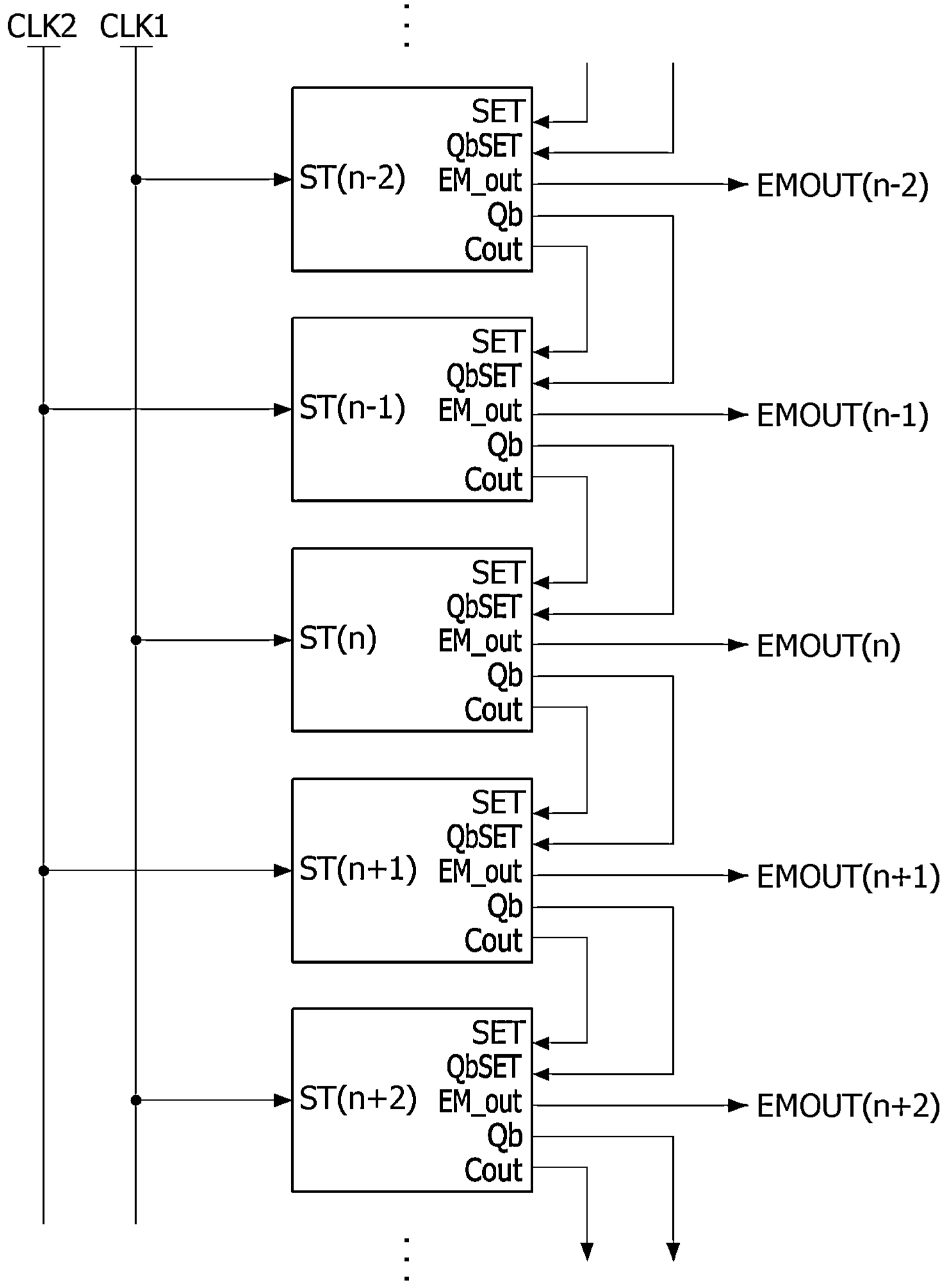
FIG. 6 is a view schematically illustrating a shift register of a gate driver according to a third embodiment of the present disclosure.

FIG. 6 is a view schematically illustrating a shift register of a gate driver according to a third embodiment of the present disclosure;

Referring to FIG. 6, the gate driver according to the embodiment includes a shift register synchronized with a shift clock CLK to sequentially output pulses of a gate signal (hereinafter, referred to as "EM pulses") EMOUT(n−2) to EMOUT(n+2).

The shift register includes a plurality of signal transmission units ST(n−2), ST(n−1), ST(n), ST(n+1), and ST(n+2) cascade-connected via a carry line to which a carry signal is applied.

A timing controller 130 (see FIG. 11) may adjust a width and a multi-output of an output signal EMOUT of the gate driver 120 using a start pulse VST input to the gate driver 120.

A start signal VST is generally input to a first signal transmission unit. In FIG. 6, an n−2th signal transmission unit ST(n−2) may be the first signal transmission unit receiving the start signal VST.

The signal transmission units ST(n−2), ST(n−1), ST(n), ST(n+1), and ST(n+2) respectively receive a start pulse or carry signals Cout(n−2), Cout(n−1), Cout(n), Cout(n+1), and Cout(n+2) output from a previous signal transmission unit, and receive the shift clock CLK. A first signal transmission unit ST(n−2) starts to be driven according to the start pulse VST, and the other signal transmission units ST(n−1), ST(n), ST(n+1), and ST(n+2) respectively receive the carry signals Cout(n−2), Cout(n−1), Cout(n), and Cout (n+1) from the previous signal transmission unit to start to be driven. The shift clock CLK may be an N (N is a positive integer greater than or equal to 2) phase clock. For example, the shift clock CLK may be two-phase clocks CLK1 and CLK2. The phases of the two-phase shift clocks CLK1 and CLK2 are opposite to each other.

The signal transmission units ST(n−2) to ST(n+2) may output a carry signal Cout through second output nodes while outputting EM pulses EMOUT(n−2) to EMOUT(n+2) through first output nodes, respectively.

Figure 7:
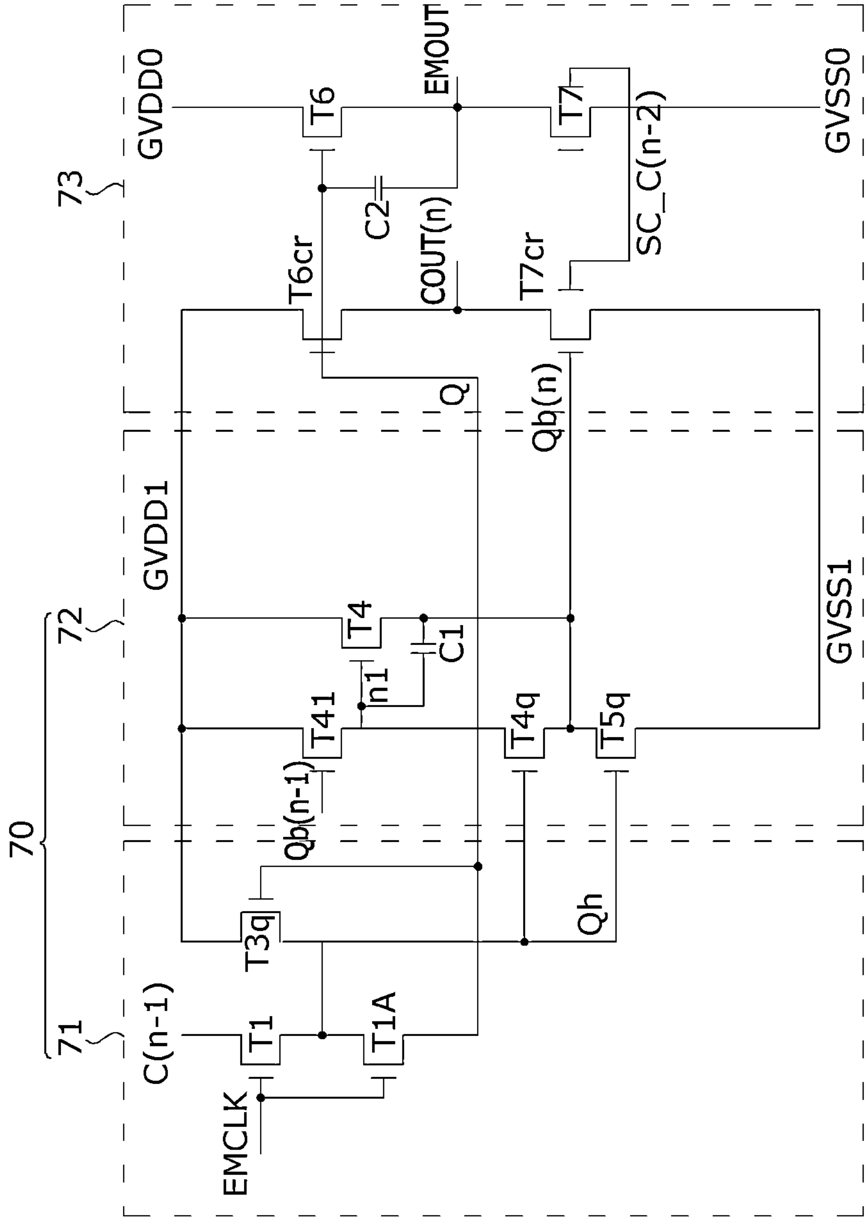
FIG. 7 is a circuit diagram illustrating the gate driver according to the third embodiment of the present disclosure in detail.
Figure 8:
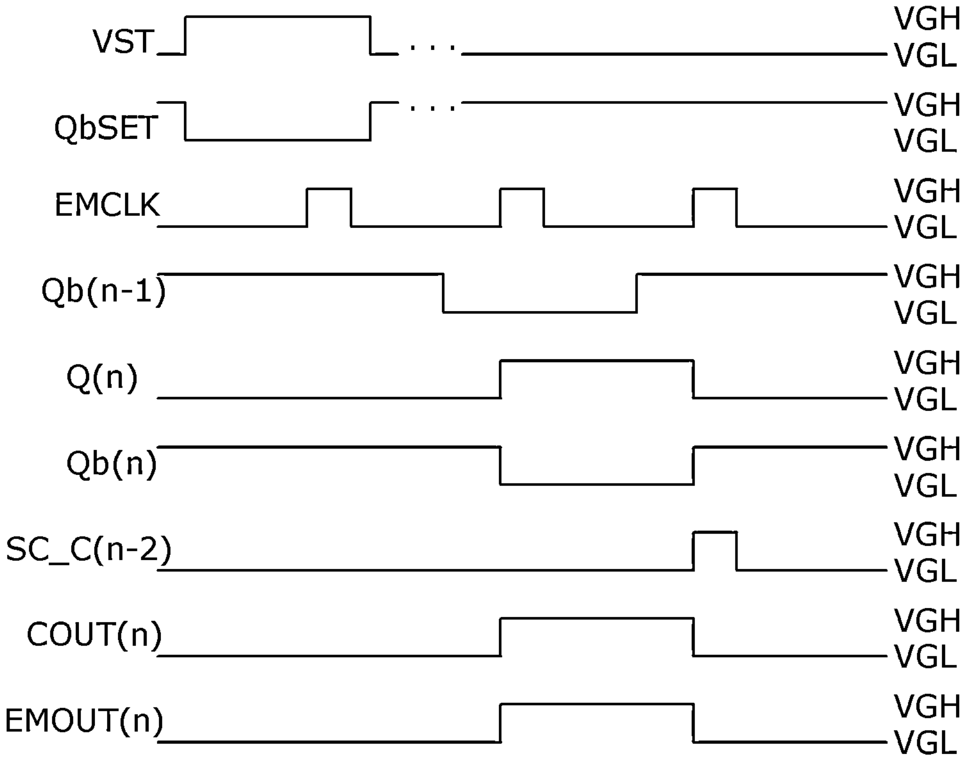
FIG. 8 is a waveform diagram illustrating input/output signals and voltages of control nodes of the gate driver shown in FIG. 7.

FIG. 7 is a circuit diagram illustrating the gate driver according to the third embodiment of the present disclosure in detail. A circuit shown in FIG. 7 is a circuit of an nth (n is a positive integer) signal transmission unit ST(n). Other signal transmission units may be implemented with circuits substantially the same as the nth signal transmission unit ST(n). FIG. 8 is a waveform diagram illustrating input/output signals and voltages of control nodes of the gate driver shown in FIG. 7. Here, an example in which the gate driver is implemented as an EM driver will be described.

Referring to FIGS. 7 and 8, the EM driver according to the embodiment may include a first control node (hereinafter referred to as a "Q node"), a second control node (hereinafter referred to as a "Qb node"), a first circuit unit 71, a second circuit unit 72, and an output unit 73.

The first circuit unit 71 serves to control charging and discharging of the Q node Q and the Qb node Qb(n). When a shift clock EMCLK has a voltage greater than or equal to a gate-on voltage VGH, the first circuit unit 71 supplies a voltage of an n−1th carry signal C(n−1) from an n−1th signal transmission unit ST(n−1), which is a previous signal transmission unit, to a first control node Q to charge the first control node Q. This first circuit unit 71 includes first to third transistors T1, T1A, and T3*q*.

The first transistor T1 is turned on to supply the voltage of the carry signal C(n−1) to a buffer node Qh when the shift clock EMCLK is the gate-on voltage VGH. The first transistor T1 includes a first electrode connected to an n−1th carry signal C(n−1) line, a gate electrode to which the shift clock EMCLK is applied, and a second electrode connected to the buffer node Qh.

The second transistor T1A is turned on to supply a voltage of the buffer node Qh to the first control node Q to charge the first control node Q when the shift clock EMCLK is the gate-on voltage VGH. The second transistor T1A includes a first electrode connected to the buffer node Qh, a gate electrode to which the shift clock EMCLK is applied, and a second electrode connected to the first control node Q.

The first and second transistors T1 and T1A are connected in series. The first and second transistors T1 and T1A are connected in series between the n−1th carry signal C(n−1) line and the buffer node Qh.

The third transistor T3*q* is turned on to supply the second high potential voltage to the buffer node Qh through a second high potential voltage line GVDD1 when the first control node Q is charged. The second high potential voltage is supplied to the buffer node Qh through the second high potential voltage line GVDD1. The third transistor T3*q* includes a first electrode connected to the second high potential voltage line GVDD1, a gate electrode connected to the first control node Q, and a second electrode connected to the buffer node Qh.

The second circuit unit 72 includes an inverter circuit which inverts a voltage of the first control node Q and applies the inverted voltage to the second control node Qb(n). The inverter circuit of the second circuit unit 72 includes a first Qb logic generator and a second Qb logic generator.

The first Qb logic generator includes a plurality of transistors T4 and T41. The second Qb logic generator includes a plurality of transistors T4*q* and T5*q*, and a plurality of transistors T4*q* and T5*q* are connected in series.

The first Qb logic generator switches a current path between the second high potential voltage line GVDD1 and the second control node Qb(n) according to a voltage of a Qb node Qb(n−1) from the n−1th signal transmission unit ST(n−1).

A fourth transistor T4 is turned on to charge the Qb node Qb(n) to the gate-on voltage VGH by connecting the second high potential voltage line GVDD1 to the Qb node Qb(n) when a voltage of a first node n1 is the gate-on voltage VGH. The fourth transistor T4 includes a first electrode connected to the second high potential voltage line GVDD1, a gate electrode connected to the first node n1, and a second electrode connected to the Qb node Qb(n). A first capacitor C1 is connected between the gate electrode and the second electrode of the fourth transistor T4. When the fourth transistor T4 is turned on by the first capacitor C1, the voltage of the first node n1 may be boosted.

A fourth-1 transistor T41 is turned on when the voltage of the Qb node Qb(n−1) of the n−1th signal transmission unit ST(n−1) is the gate-on voltage VGH to charge the first node n1 to the gate-on voltage VGH by supplying the second high potential voltage to the first node n1. The fourth-1 transistor T41 includes a first electrode connected to the second high potential voltage line GVDD1, a gate electrode connected to the Qb node Q(n−1) of the n−1th signal transmission unit ST(n−1), and a second electrode connected to the first node n1.

The second Qb logic generator is turned on to discharge the Qb node Qb(n) when the voltage of the Q node Q and the voltage of the previous carry signal C(n−1) input from the n−1th signal transmission unit ST(n−1) are the gate-on voltage VGH.

A fourth-q transistor T4*q* is turned on to connect the first node n1 to the Qb node Qb(n) when the voltage of the buffer node Qh is the gate-on voltage VGH. The fourth-q transistor T4*q* includes a first electrode connected to the first node n1, a gate electrode connected to the buffer node Qh, and a second electrode connected to the Qb node Qb(n).

A fifth-q transistor T5*q* is turned on to discharge the voltage of the Qb node Qb(n) to a second low potential voltage by connecting the Qb node Qb(n) to a second low potential voltage line GVSS1 when the voltage of the buffer node Qh is the gate-on voltage VGH. The fifth-q transistor T5*q* includes a first electrode connected to the Qb node Qb(n), a gate electrode connected to the buffer node Qh, and a second electrode connected to the second low potential voltage line GVSS1.

The output unit 73 may output an emission control signal EMOUT to the first output node, and output a carry signal COUT(n) to the second output node based on potentials of the Q node Q and the Qb node Qb(n). The output unit 73 may include a first pull-up transistor T6, a first pull-down transistor T7, a second pull-up transistor T6*cr*, and a second pull-down transistor T7*cr*.

The first pull-up transistor T6 and the first pull-down transistor T7 charge and discharge the first output node according to the voltages of the Q node Q and the Qb node Qb(n) to output the emission control signal EMOUT. The first pull-up transistor T6 includes a gate electrode connected to the first control node Q, a first electrode connected to a first high potential voltage line GVDD to which a first high potential voltage is applied, and a second electrode connected to the first output node. The second capacitor C2 is connected between the gate electrode and the second electrode of the first pull-up transistor T6. The first pull-down transistor T7 is connected to the first pull-up transistor T6 with the first output node therebetween. The first pull-down transistor T7 includes a gate electrode connected to a second control node Qb(n), a first electrode connected to the first output node, a back gate electrode receiving the carry signal from a previous signal transmission unit and a second electrode connected to a first low potential voltage line GVSS0 to which a first low potential voltage is applied.

The second pull-up transistor T6*cr* and the second pull-down transistor T7*cr* charge and discharge the second output node according to the voltages of the Q node Q and the Qb node Qb(n) to output the carry signal COUT(n). The second pull-up transistor T6*cr* includes a gate electrode connected to the Q node Q, a first electrode connected to the second high potential voltage line GVDD1 to which the second high potential voltage is applied, and a second electrode connected to the second output node. The second pull-down transistor T7*cr* is connected to the second pull-up transistor T6*cr* with the second output node therebetween. The second pull-down transistor T7*cr* includes a gate electrode connected to the Qb node Qb(n), a first electrode connected to the second output node, a back gate electrode receiving the carry signal from a previous signal transmission unit and a second electrode connected to the second low potential voltage line GVSS1 to which the second low potential voltage is applied.

A structural advantage of the output unit applied to the EM driver according to the embodiment will be described.

Figure 9A:
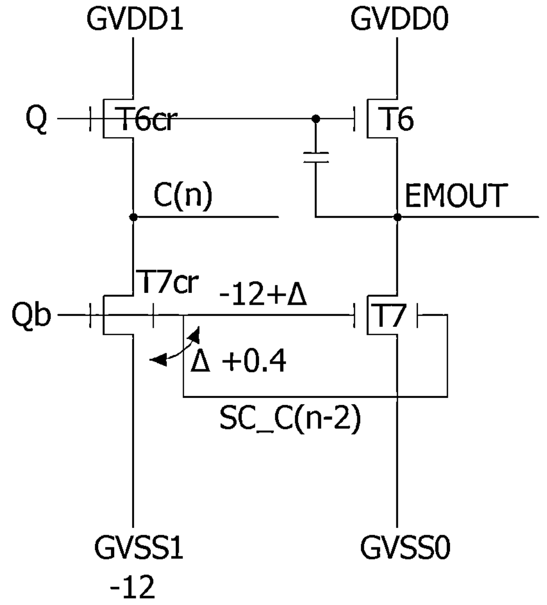
FIGS. 9A to 9C are views for comparatively describing a leakage current reduction principle of an output unit.
Figure 9B:
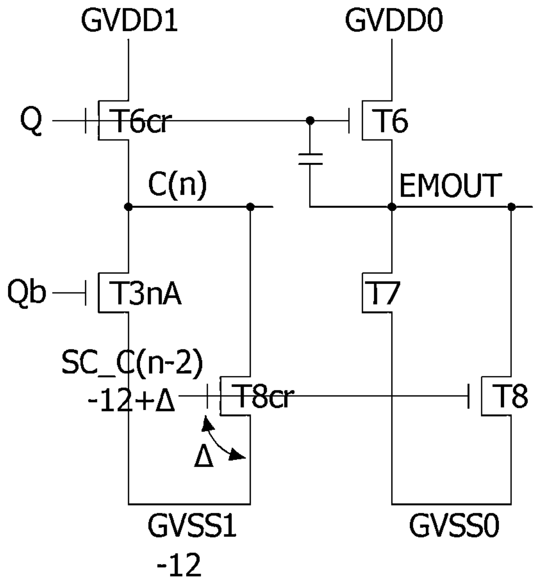
Figure 9C:
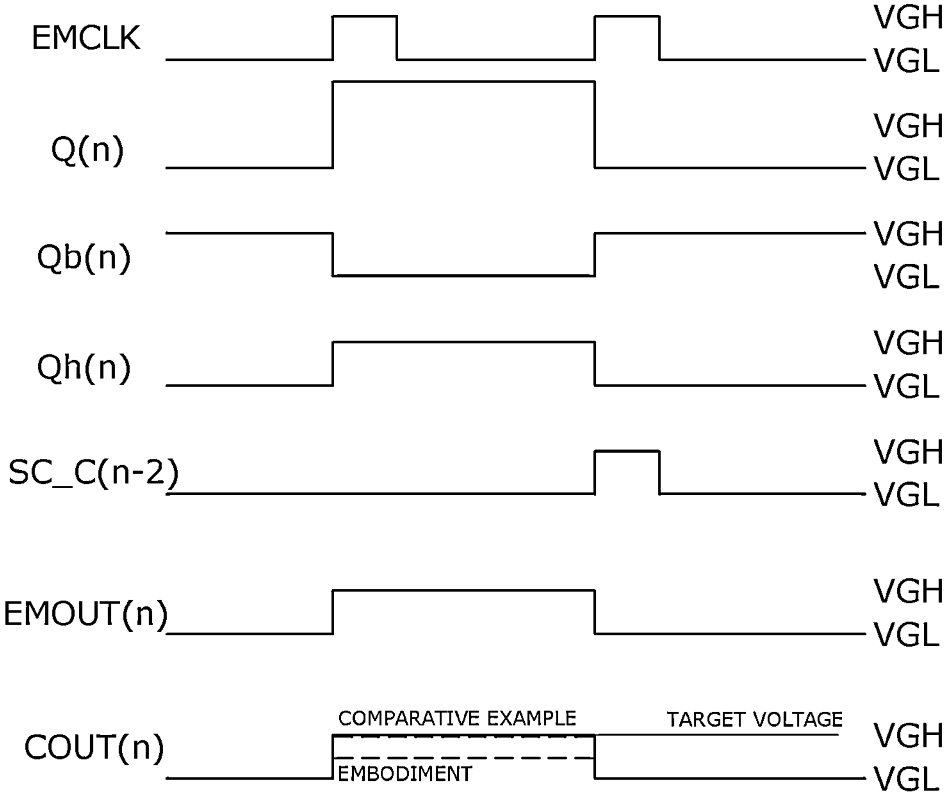

FIGS. 9A to 9C are views for comparatively describing a leakage current reduction principle of an output unit.

Referring to FIG. 9A, the first pull-down transistor T7 and the second pull-down transistor T7*cr* of the output unit according to the embodiment are implemented in a double-gate structure using an LS metal layer, which is a light blocking layer of a coplanar element, as a back gate electrode to receive the negative bias, that is, a carry signal C(n−2) of a gate low voltage, from the scan driver to the back gate electrode while being turned off as the Qb node Qb(n) is discharged, and a threshold voltage Vth of each of the first pull-down transistor T7 and the second pull-down transistor T7*cr* increases due to the negative bias, and accordingly, the leakage current is reduced.

As shown in FIG. 9B, in a circuit for comparison with the output unit of the embodiment, a second-1 pull-down transistor T8*cr* is added to the second pull-down transistor T7*cr*, and thus even when the second pull-down transistor T7*cr* is turned off as the second control node is discharged, and a carry signal SC_C(n−2) of a low voltage level is applied to the second-1 pull-down transistor T8*cr*, since the threshold voltage is shifted to a negative polarity and the carry signal SC_C(n−2) of the low voltage level leaks as much as a threshold voltage Δ, a leakage current as much as the threshold voltage Δ may also be generated from a gate-source voltage Vgs of the second-1 pull-down transistor T8*cr*, and accordingly, power consumption increases. In this case, in the circuit of the comparative example, a leakage current is generated as much as a threshold voltage, that is, Vth(Δ), but in the circuit of the embodiment, the leakage current is generated as much as Vth×0.42, and thus is reduced. The leakage current generated in the circuit of the embodiment is reduced due to an effect of the double-gate structure, and is reduced in proportion to a capacitance ratio (0.42) of an upper gate and a lower gate. The capacitance ratio of the upper gate and the lower gate may vary according to various design parameters such as a length, a thickness, a width, and the like of each of the upper gate and lower gate.

In this case, the leakage current is reduced in proportion to the capacitance ratio of the upper gate and lower gate, and thus it may be effective only when a capacitance of the upper gate is smaller than a capacitance of the bottom gate.

In the embodiment, by applying signals applied to a first-1 pull-down transistor T8 and a second-1 pull-down transistor T8*cr* of the comparative example to back gate electrodes of the first pull-down transistor T7 and the second pull-down transistor T7*cr*, the pull-down transistor T7 and the second pull-down transistor T7*cr* are configured to also serve as the first-1 pull-down transistor T8 and the second-1 pull-down transistor T8*cr*.

In the circuit of the embodiment in FIG. 9A, since the transistors T8 and T8*cr* are removed compared to the circuit of the comparative example in FIG. 9B, a leakage current generation path may decrease and a bezel is reduced as much as the decrease. In this case, the circuit of the embodiment requires a size increase of the transistor to maintain a falling characteristic the same as that of the circuit of the comparative example, but an amount of leakage current is reduced, and thus there is an advantage in improving power consumption and improving an output.

As shown in FIG. 9C, since the leakage current is generated toward the output node from which the carry signal COUT(n) is output, a difference between a target voltage of the output node in the circuit of the comparative example and an actual voltage occurs. On the other hand, there is no difference between the target voltage of the output node in the circuit of the embodiment and the actual voltage.

Figure 10:
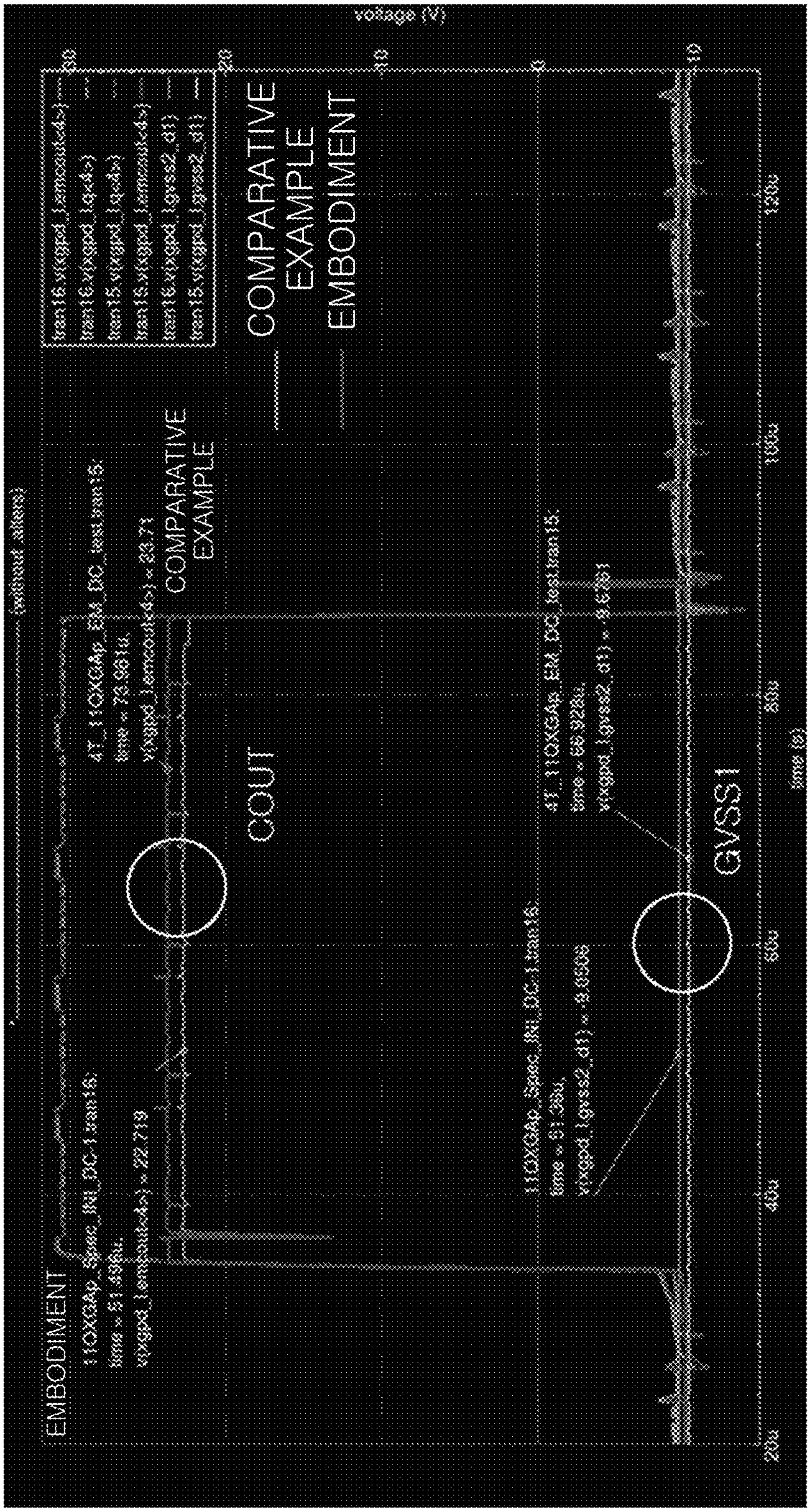
FIG. 10 is a view illustrating a simulation result using an EM driver shown in FIG. 7.

FIG. 10 is a view illustrating a simulation result using the EM driver shown in FIG. 7.

Referring to FIG. 10, a result of a simulation using the EM driver according to the embodiment is shown. It can be seen that the leakage current in the low potential voltage line is reduced more in the circuit of the embodiment than the circuit of the comparative example. In addition, it can be seen that the leakage current at the output node from which the carry signal is output is also reduced more in the circuit of the embodiment than the circuit of the comparative example.

Figure 11:
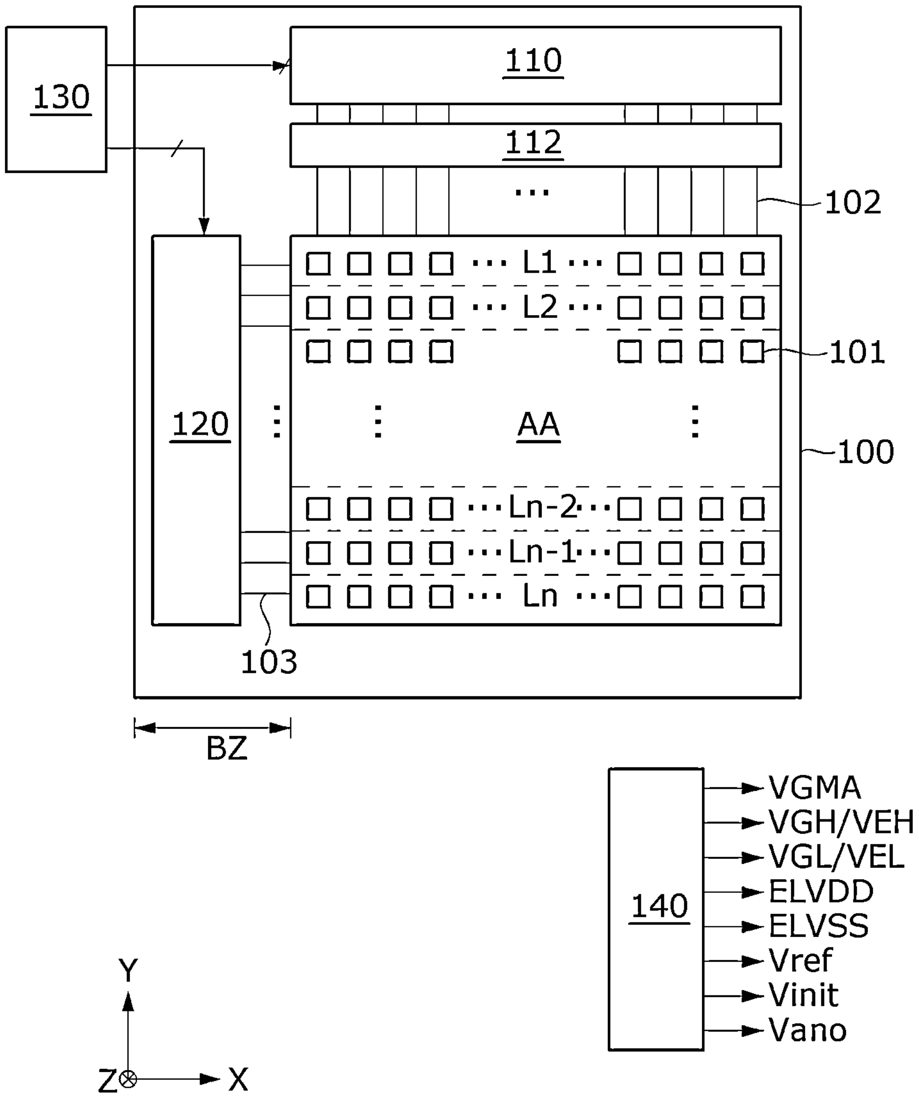
FIG. 11 is a block diagram illustrating a display device according to the embodiment of the present disclosure.
Figure 12:
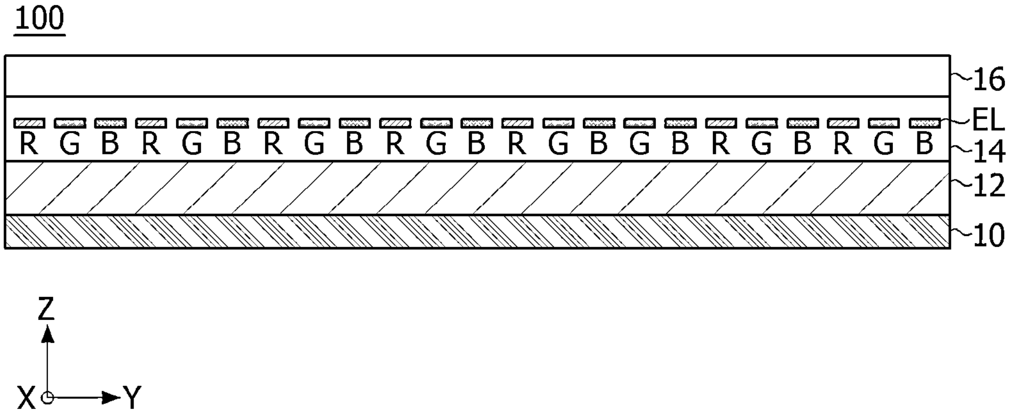
FIG. 12 is a view illustrating a cross-sectional structure of a display panel shown in FIG. 11.

FIG. 11 is a block diagram illustrating a display device according to an embodiment of the present disclosure, and FIG. 12 is a diagram illustrating a cross-sectional structure of the display panel shown in FIG. 11.

Referring to FIGS. 11 and 12, the display device according to an embodiment of the present disclosure includes a display panel 100, a display panel driver for writing pixel data to pixels of the display panel 100, and a power supply 140 for generating power necessary for driving the pixels and the display panel driver.

The display panel 100 may be a display panel having a rectangular structure having a length in an X-axis direction, a width in a Y-axis direction, and a thickness in a Z-axis direction. The display panel 100 includes a pixel array AA that displays an input image. The pixel array AA includes a plurality of data lines 102, a plurality of gate lines 103 intersected with the data lines 102, and pixels arranged in a matrix form. The display panel 100 may further include power lines commonly connected to pixels. The power lines may include a power line to which a pixel driving voltage ELVDD is applied, a power line to which an initialization voltage Vinit is applied, a power line to which a reference voltage Vref is applied, and a power line to which a low potential power voltage ELVSS is applied. These power lines are commonly connected to the pixels.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the gate lines 103. Pixels arranged in a column direction Y along a data line direction share the same data line 102. One horizontal period 1H is a time obtained by dividing one frame period by the total number of pixel lines L1 to Ln.

The display panel 100 may be implemented as a non-transmissive display panel or a transmissive display panel. The transmissive display panel may be applied to a transparent display device in which an image is displayed on a screen and an actual background may be seen.

The display panel 100 may be implemented as a flexible display panel. The flexible display panel may be made of a plastic OLED panel. An organic thin film may be disposed on a back plate of the plastic OLED panel, and the pixel array AA and light emitting element may be formed on the organic thin film.

To implement color, each of the pixels 101 may be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels may further include a white sub-pixel. Each of the sub-pixels includes a pixel circuit. The pixel circuit is connected to the data line, the gate line and power line.

The pixels may be arranged as real color pixels and pentile pixels. The pentile pixel may realize a higher resolution than the real color pixel by driving two sub-pixels having different colors as one pixel 101 using a preset pixel rendering algorithm. The pixel rendering algorithm may compensate for insufficient color representation in each pixel with a color of light emitted from an adjacent pixel.

Touch sensors may be disposed on the display panel 100. A touch input may be sensed using separate touch sensors or may be sensed through pixels. The touch sensors may be disposed as an on-cell type or an add-on type on the screen of the display panel or implemented as in-cell type touch sensors embedded in the pixel array AA.

As shown in FIG. 12, when viewed from a cross-sectional structure, the display panel 100 may include a circuit layer 12, a light emitting element layer 14, and an encapsulation layer 16 stacked on a substrate 10.

The circuit layer 12 may include a pixel circuit connected to wirings such as a data line, a gate line, and a power line, a gate driver (GIP) connected to the gate lines, and the like. The wirings and circuit elements of the circuit layer 12 may include a plurality of insulating layers, two or more metal layers separated with the insulating layer therebetween, and an active layer including a semiconductor material.

The light emitting element layer 14 may include a light emitting element EL driven by a pixel circuit. The light emitting element EL may include a red (R) light emitting element, a green (G) light emitting element, and a blue (B) light emitting element. The light emitting element layer 14 may include a white light emitting element and a color filter. The light emitting elements EL of the light emitting element layer 14 may be covered by a protective layer including an organic film and a passivation film.

The encapsulation layer 16 covers the light emitting element layer 14 to seal the circuit layer 12 and the light emitting element layer 14. The encapsulation layer 16 may have a multilayered insulating structure in which an organic film and an inorganic film are alternately stacked. The inorganic film blocks the penetration of moisture and oxygen. The organic film planarizes the surface of the inorganic film. When the organic film and the inorganic film are stacked in multiple layers, a movement path of moisture or oxygen becomes longer compared to a single layer, so that penetration of moisture and oxygen affecting the light emitting element layer 14 can be effectively blocked.

A touch sensor layer may be disposed on the encapsulation layer 16. The touch sensor layer may include capacitive type touch sensors that sense a touch input based on a change in capacitance before and after the touch input. The touch sensor layer may include metal wiring patterns and insulating layers forming the capacitance of the touch sensors. The capacitance of the touch sensor may be formed between the metal wiring patterns. A polarizing plate may be disposed on the touch sensor layer. The polarizing plate may improve visibility and contrast ratio by converting the polarization of external light reflected by metal of the touch sensor layer and the circuit layer 12. The polarizing plate may be implemented as a polarizing plate in which a linear polarizing plate and a phase delay film are bonded, or a circular polarizing plate. A cover glass may be adhered to the polarizing plate.

The display panel 100 may further include a touch sensor layer and a color filter layer stacked on the encapsulation layer 16. The color filter layer may include red, green, and blue color filters and a black matrix pattern. The color filter layer may replace the polarizing plate and increase the color purity by absorbing a part of the wavelength of light reflected from the circuit layer and the touch sensor layer. In this embodiment, by applying the color filter layer 20 having a higher light transmittance than the polarizing plate to the display panel, the light transmittance of the display panel 100 can be improved, and the thickness and flexibility of the display panel 100 can be improved. A cover glass may be adhered on the color filter layer.

The power supply 140 generates DC power required for driving the pixel array AA and the display panel driver of the display panel 100 by using a DC-DC converter. The DC-DC converter may include a charge pump, a regulator, a buck converter, a boost converter, and the like. The power supply 140 may adjust a DC input voltage from a host system (not shown) and thereby generate DC voltages such as a gamma reference voltage VGMA, gate-on voltages VGH and VEH, gate-off voltages VGL and VEL, a pixel driving voltage ELVDD, a pixel low-potential power supply voltage ELVSS, a reference voltage Vref, an initial voltage Vinit, an anode voltage Vano, and the like. The gamma reference voltage VGMA is supplied to a data driver 110. The gate-on voltages VGH and VEH and the gate-off voltages VGL and VEL are supplied to a gate driver 120. The pixel driving voltage ELVDD and the pixel low-potential power supply voltage ELVSS, a reference voltage Vref, an initial voltage Vinit, an anode voltage Vano, and the like are commonly supplied to the pixels.

The display panel driver writes pixel data (digital data) of an input image to the pixels of the display panel 100 under the control of a timing controller (TCON) 130.

The display panel driver includes the data driver 110 and the gate driver 120. A display panel driver may further include a demultiplexer array 112 disposed between a data driver 110 and data lines 102.

The demultiplexer array 112 sequentially supplies data voltages output from channels of the data driver 110 to the data lines 102 using a plurality of demultiplexers (DEMUXs). The demultiplexers may include a plurality of switch elements disposed on the display panel 100. When the demultiplexers are disposed between output terminals of the data driver 110 and the data lines 102, the number of channels of the data driver 110 may be reduced. The demultiplexer array 112 may be omitted.

The display panel driver may further include a touch sensor driver for driving the touch sensors. The touch sensor driver is omitted from FIG. 1. The touch sensor driver may be integrated into one drive integrated circuit (IC). In a mobile device or wearable device, the timing controller 130, the power supply 140, the data driver 110, the touch sensor driver, and the like may be integrated into one drive integrated circuit (IC).

A display panel driver may operate in a low-speed driving mode under the control of a timing controller (TCON) 130. The low-speed driving mode may be set to reduce power consumption of a display device when there is no change in an input image for a preset number of frames in analysis of the input image. In the low-speed driving mode, the power consumption of the display panel driver and a display panel 100 may be reduced by lowering a refresh rate of pixels when a still image is input for a predetermined time or longer. A low-speed driving mode is not limited to a case in which a still image is input. For example, when the display device operates in a standby mode or when a user command or an input image is not input to a display panel driver for a predetermined time or more, the display panel driver may operate in the low-speed driving mode.

The data driver 110 generates a data voltage Vdata by converting pixel data of an input image received from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is outputted through the output buffer AMP in each of the channels of the data driver 110.

The gate driver 120 may be implemented as a gate in panel (GIP) circuit formed directly on a circuit layer 12 of the display panel 100 together with the TFT array of the pixel array AA. The gate in panel (GIP) circuit may be disposed on a bezel area BZ that is a non-display area of the display panel 100 or dispersed in the pixel array on which an input image is reproduced. The gate driver 120 sequentially outputs gate signals to the gate lines 103 under the control of the timing controller 130. The gate driver 120 may sequentially supply the gate signals to the gate lines 103 by shifting the gate signals using a shift register. The gate signal may include scan pulses, emission control pulses (hereinafter referred to as "EM pulses"), initial pulses, and sensing pulses.

The shift register of the gate driver 120 outputs a pulse of the gate signal in response to a start pulse and a shift clock from the timing controller 130, and shifts the pulse according to the shift clock timing.

In this case, the gate driver 120 may be implemented as a gate driver capable of decreasing a leakage current while reducing the number of transistors as shown in FIGS. 1, 3, 6, and 8. In the present invention, all transistors in the display panel including the data driver, the gate driver, and sub-pixels may be implemented with oxide thin film transistors (TFTs) including an n-channel type oxide semiconductor.

The timing controller 130 receives, from a host system (not shown), digital video data DATA of an input image and a timing signal synchronized therewith. The timing signal includes a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync may be omitted. The data enable signal DE has a cycle of one horizontal period (1H).

A host system may be any one of a television (TV) system, a tablet computer, notebook computer, a navigation system, a personal computer (PC), a home theater system, a mobile device, and a vehicle system. The host system may scale an image signal from a video source according to the resolution of the display panel 100 and transmit the image signal to a timing controller 130 together with the timing signal.

The timing controller 130 multiplies an input frame frequency by i and controls the operation timing of the display panel driving circuit with a frame frequency of the input frame frequency×i (i is a positive integer greater than 0) Hz. The input frame frequency is 60 Hz in the NTSC (National Television Standards Committee) scheme and 50 Hz in the PAL (Phase-Alternating Line) scheme. The timing controller 130 may lower a driving frequency of the display panel driver by lowering a frame frequency to a frequency between 1 Hz and 30 Hz to lower a refresh rate of pixels in the low-speed driving mode.

Based on the timing signals Vsync, Hsync, and DE received from the host system, the timing controller 130 generates a data timing control signal for controlling the operation timing of the data driver 110, a control signal for controlling the operation timing of the de-multiplexer array 112, and a gate timing control signal for controlling the operation timing of the gate driver 120. The timing controller 130 controls an operation timing of the display panel driver to synchronize the data driver 110, the demultiplexer array 112, a touch sensor driver, and a gate driver 120.

The voltage level of the gate timing control signal outputted from the timing controller 130 may be converted into the gate-on voltages VGH and VEH and the gate-off voltages VGL and VEL through a level shifter (not shown) and then supplied to the gate driver 120. That is, the level shifter converts a low level voltage of the gate timing control signal into the gate-off voltages VGL and VEL and converts a high level voltage of the gate timing control signal into the gate-on voltages VGH and VEH. The gate timing signal includes the start pulse and the shift clock.

Due to process variations and device characteristic variations caused in a manufacturing process of the display panel 100, there may be a difference in electrical characteristics of the driving element between the pixels, and this difference may increase as a driving time of the pixels elapses. An internal compensation technology or an external compensation technology may be applied to an organic light-emitting diode display to compensate for the variations in electrical characteristics of a driving element between the pixels. The internal compensation technology samples a threshold voltage of the driving element for each sub-pixel using an internal compensation circuit implemented in each pixel circuit to compensate a gate-source voltage Vgs of the driving element as much as the threshold voltage. The external compensation technology senses in real time a current or voltage of the driving element which changes according to the electrical characteristics of the driving element using an external compensation circuit. The external compensation technology compensates the variation (or change) in the electrical characteristics of the driving element in each pixel in real time by modulating the pixel data (digital data) of the input image as much as the electric characteristic variation (or change) of the driving element sensed for each pixel. The display panel driver may drive the pixels using the external compensation technology and/or the internal compensation technology. A pixel circuit of the present disclosure may be implemented as a pixel circuit to which an internal compensation circuit is applied.

Figure 13:
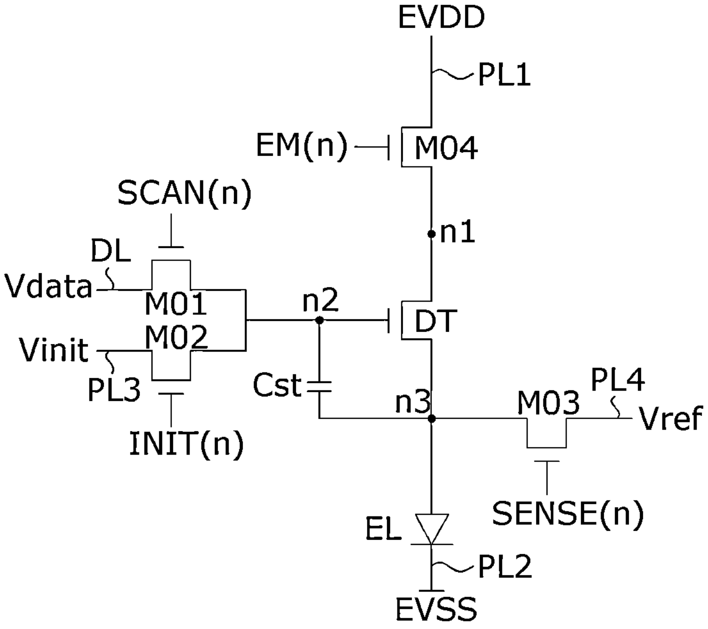
FIG. 13 is a circuit diagram illustrating a pixel circuit applied to the display panel shown in FIG. 11.
Figure 14:
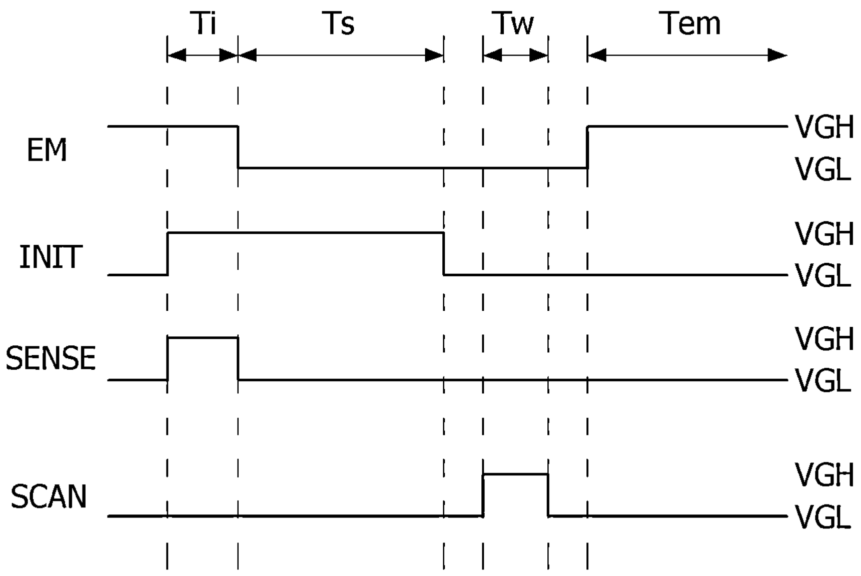
FIG. 14 is a waveform diagram illustrating a driving method of the pixel circuit shown in FIG. 13.

FIG. 13 is a circuit diagram illustrating a pixel circuit applied to a display panel shown in FIG. 11, and FIG. 14 is a waveform diagram illustrating a driving method of the pixel circuit shown in FIG. 13.

Referring to FIGS. 13 and 14, the pixel circuit may include a light emitting element EL, a driving element DT that drives the light emitting element EL, a plurality of switch elements M01, M02, M03, and M04, and a capacitor Cst.

This pixel circuit is connected to a first power line PL1 to which a pixel driving voltage EVDD is applied, a second power line PL2 to which a low potential power voltage EVSS is applied, a third power line PL3 to which an initialization voltage Vinit is applied, a fourth power line PL4 to which a reference voltage Vref is applied, a data line DL to which a data voltage Vdata is applied, and gate lines to which gate signals INIT(n), SENSE(n), SCAN(n), and EM(n) are applied. The gate signals INIT(n), SENSE(n), SCAN(n), and EM(n) may be generated by the gate driver according to the embodiment and applied to the pixel circuit through the gate lines.

The light emitting element EL may be implemented as an OLED. The OLED includes an organic compound layer formed between an anode electrode and a cathode electrode. The organic compound layer may include, but is not limited to, a hole injection layer (HIL), a hole transport layer (HTL), an emission layer (EML), an electron transport layer (ETL), and an electron injection layer (EIL). The anode electrode of the light emitting element EL is connected to a third node n3, and the cathode electrode is connected to a second power line PL2 to which a low potential power voltage EVSS is applied. When a voltage is applied to the anode and cathode electrodes of the light emitting element EL, holes passing through the hole transport layer (HTL) and electrons passing through the electron transport layer (ETL) are moved to the emission layer (EML) and form exciton, which thereby emits visible light in the emission layer (EML).

An organic light emitting diode used as the light emitting element may have a tandem structure in which a plurality of light emitting layers are stacked. The organic light emitting diode having the tandem structure may improve the luminance and lifespan of the pixel.

The driving element DT generates a current according to a gate-source voltage Vgs to drive the light emitting element EL. The driving element DT includes a first electrode connected to a first node n1, a gate electrode connected to a second node n2, and a second electrode connected to a third node n3.

A first switch element M01 is turned on according to a gate-on voltage VGH of a scan pulse SCAN(n) to apply the data voltage to the second node n2. The first switch element M01 includes a first electrode connected to the data line DL to which the data voltage is applied, a gate electrode to which the scan pulse SCAN(n) is applied, and a second electrode connected to the second node n2.

A second switch element M02 is turned on according to a gate-on voltage VGH of an initialization pulse INIT(n) to apply the initialization voltage to the second node n2. The second switch element M02 includes a first electrode connected to the third power line PL3 to which the initialization voltage is applied, a gate electrode to which the initialization pulse INIT(n) is applied, and a second electrode connected to the second node n2.

A third switch element M03 is turned on according to a gate-on voltage VGH of a sensing pulse SENSE(n) to apply the reference voltage to the third node n3. The third switch element M03 includes a first electrode connected to the third node n3, a gate electrode to which the sensing pulse is applied, and a second electrode connected to the fourth power line PL4 to which the reference voltage is applied.

A fourth switch element M04 is turned on according to a gate-on voltage VGH of an emission control pulse EM(n) to apply the pixel driving voltage to the first node n1. The fourth switch element M04 includes a first electrode connected to the first power line to which the pixel driving voltage is applied, a gate electrode to which the emission control pulse is applied, and a second electrode connected to the first node n1.

A capacitor Cst is connected between the second node n2 and the third node n3. In the present invention, the first and second high potential voltage line may be collectively called as high potential voltage line, and the first, second and third low potential voltage line may be collectively called as low potential voltage line.

As shown in FIG. 14, the pixel circuit may be driven in the order of an initialization operation Ti, a sensing operation Ts, a data writing operation Tw, and a light emitting operation Tem. In the sensing operation Ts, a threshold voltage Vth of the driving element DT is sensed and stored in the capacitor Cst. In the data writing operation Tw, the data voltage Vdata of the pixel data is applied to the second node n2. In the light emitting operation Tem, the light emitting element EL may emit light with a luminance corresponding to a gray level value of the pixel data.

It will be apparent to those skilled in the art that various modifications and variations can be made in the gate driver and the display device including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A gate driver comprising a plurality of signal transmission units cascade-connected via a carry line to which a carry signal is for being applied from a previous signal transmission unit, wherein an nth (n is a positive integer) signal transmission unit includes:

a first circuit unit including a first Q logic generator configured to receive the carry signal from the previous signal transmission unit to charge a first control node, and a second Q logic generator configured to discharge the first control node;

a second circuit unit configured to discharge a second control node according to a voltage of the first control node; and an output unit configured to output a carry signal and a gate signal based on potentials of the first control node and the second control node, wherein the second Q logic generator includes:

a second-1 transistor having a first electrode connected to the first control node, a gate electrode connected to the second control node, a back gate electrode for receiving a carry signal from a next signal transmission unit, and a second electrode connected to a buffer node; and a second-2 transistor having a first electrode connected to the buffer node, a gate electrode connected to the second control node, a back gate electrode for receiving the carry signal from the next signal transmission unit, and a second electrode connected to a low potential voltage line, and wherein the second-1 and second-2 transistors are configured to receive a carry signal of a gate low voltage from the next signal transmission unit to the respective back gate electrode while being turned off as the second control node is discharged.

2. The gate driver of claim 1, wherein the second-1 and second-2 transistors are configured to be turned on by a charging voltage of the second control node to discharge the first control node to a low potential voltage.

3. The gate driver of claim 1, wherein the second Q logic generator further includes:

a second-3 transistor having a first electrode connected to the first control node, a gate electrode for receiving a start signal, and a second electrode connected to the buffer node; and a second-4 transistor having a first electrode connected to the buffer node, a gate electrode for receiving the start signal, and a second electrode connected to the low potential voltage line.

4. The gate driver of claim 3, wherein the first Q logic generator includes:

a first-1 transistor having a first electrode and a gate electrode for receiving the carry signal from the previous signal transmission unit, and a second electrode connected to the buffer node;

a first-2 transistor having a first electrode connected to the buffer node, a gate electrode for receiving the carry signal from the previous signal transmission unit, and a second electrode connected to the first control node; and a first-3 transistor having a first electrode connected to a high potential voltage line to which a high potential voltage is for being applied, a gate electrode connected to the first control node, and a second electrode connected to the buffer node.

5. The gate driver of claim 4, wherein the second circuit unit includes:

a third-1 transistor having a first electrode connected to the high potential voltage line, a gate electrode connected to a first node, and a second electrode connected to the second control node;

a third-2 transistor having a first electrode and a gate electrode connected to the high potential voltage line, and a second electrode connected to the first node;

a third-3 transistor having a first electrode connected to the first node, a gate electrode connected to the first control node, and a second electrode to which a low potential voltage is for being applied;

a third-4 transistor having a first electrode connected to the second control node, a gate electrode connected to the first control node, and a second electrode to which the low potential voltage is for being applied; and a third-5 transistor having a first electrode connected to the second control node, a gate electrode to which the carry signal is for being applied from the previous signal transmission unit, and a second electrode to which the low potential voltage is for being applied.

6. The gate driver of claim 5, wherein the output unit includes:

a first pull-up transistor having a first electrode to which a first clock signal is for being applied, a gate electrode connected to the first control node, and a second electrode connected to a first output node;

a first pull-down transistor having a first electrode connected to the first output node, a gate electrode connected to the second control node, and a second electrode to which a first low potential voltage is for being applied;

a second pull-up transistor having a first electrode to which a second clock signal is for being applied, a gate electrode connected to the first control node, and a second electrode connected to a second output node; and a second pull-down transistor having a first electrode connected to the second output node, a gate electrode connected to the second control node, and a second electrode to which a second low potential voltage is for being applied.

7. The gate driver of claim 1, wherein the second circuit unit includes an inverter circuit which is configured to invert a voltage of the first control node and apply the inverted voltage to the second control node.

8. The gate driver of claim 7, wherein the inverter circuit includes a first Qb logic generator and a second Qb logic generator, wherein the first Qb logic generator includes a fourth transistor having a first electrode connected to a high potential voltage line, a gate electrode connected to a first node, and a second electrode connected to the second control node; and a fourth-1 transistor having a first electrode connected to the high potential voltage line, a gate electrode connected to the second control node of the previous signal transmission unit, and a second electrode connected to the first node, and wherein the second Qb logic generator includes a fourth-q transistor having a first electrode connected to the first node, a gate electrode connected to the buffer node, and a second electrode connected to the second control node; and a fifth-q transistor having a first electrode connected to the second control node, a gate electrode connected to the buffer node, and a second electrode connected to the low potential voltage line.

9. The gate driver of claim 8, wherein the first Qb logic generator further includes a capacitor connected between the gate electrode and the second electrode of the fourth transistor.

10. A gate driver comprising a plurality of signal transmission units cascade-connected via a carry line to which a carry signal is for being applied from a prior signal transmission unit, wherein an nth (n is a positive integer) signal transmission unit includes:

a circuit unit configured to receive the carry signal from the prior signal transmission unit to charge or discharge voltages of a first control node and a second control node; and an output unit configured to output a gate signal and a carry signal based on potentials of the first control node and the second control node, wherein the output unit includes:

a first pull-up transistor having a first electrode connected to a first high potential voltage line, a gate electrode connected to the first control node, and a second electrode connected to a first output node;

a first pull-down transistor having a first electrode connected to the first output node, a gate electrode connected to the second control node, a back gate electrode for receiving a carry signal from a previous signal transmission unit, and a second electrode connected to a first low potential voltage line;

a second pull-up transistor having a first electrode connected to a second high potential voltage line, a gate electrode connected to the first control node, and a second electrode connected to a second output node; and a second pull-down transistor having a first electrode connected to the second output node, a gate electrode connected to the second control node, a back gate electrode for receiving the carry signal from the previous signal transmission unit, and a second electrode connected to a second low potential voltage line, and wherein the first and second pull-down transistors are configured to receive a carry signal of a gate low voltage from the previous signal transmission unit to the respective back gate electrode while being turned off as the second control node is discharged.

11. The gate driver of claim 10, wherein the first and second pull-down transistors are configured to be turned on by a charging voltage of the second control node to discharge the first output node to a low potential voltage.

12. The gate driver of claim 10, wherein the circuit unit includes a first circuit unit configured to receive the carry signal from the prior signal transmission unit to charge the first control node, wherein the first circuit unit includes:

a first transistor having a first electrode for receiving the carry signal from the prior signal transmission unit, a gate electrode to which a clock signal is for being applied, and a second electrode connected to a buffer node;

a second transistor having a first electrode connected to the buffer node, a gate electrode to which the clock signal is for being applied, and a second electrode connected to the first control node; and a third transistor having a first electrode connected to the second high potential voltage line to which a second high potential voltage is for being applied, a gate electrode connected to the first control node, and a second electrode connected to the buffer node.

13. The gate driver of claim 12, wherein the circuit unit includes a second circuit unit configured to discharge the second control node according to a voltage of the first control node, wherein the second circuit unit includes:

a fourth transistor having a first electrode connected to the second high potential voltage line, a gate electrode connected to a first node, and a second electrode connected to the second control node;

a fifth transistor having a first electrode connected to the second high potential voltage line, a gate electrode to which a voltage of the second control node is for being applied from the previous signal transmission unit, and a second electrode connected to the first node;

a sixth transistor having a first electrode connected to the first node, a gate electrode connected to the buffer node, and a second electrode connected to the second control node; and a seventh transistor having a first electrode connected to the second control node, a gate electrode connected to the buffer node, and a second electrode connected to the second low potential voltage line to which a second low potential voltage is for being applied.

14. A display device comprising:

a display panel on which a plurality of data lines, a plurality of gate lines crossing the data lines, a plurality of power lines to which different constant voltages are for being applied, and a plurality of sub-pixels are disposed;

a data driver configured to supply a data voltage of pixel data to the data lines; and a gate driver configured to supply a gate signal to the gate lines, wherein the gate driver includes a plurality of signal transmission units cascade-connected via a carry line to which a carry signal is for being applied from a previous signal transmission unit, wherein an nth (n is a positive integer) signal transmission unit includes:

a first circuit unit including a first Q logic generator configured to receive the carry signal from the previous signal transmission unit to charge a first control node, and a second Q logic generator configured to discharge the first control node;

a second circuit unit configured to discharge a second control node according to a voltage of the first control node; and an output unit configured to output a carry signal and a gate signal based on potentials of the first control node and the second control node, wherein the second Q logic generator includes:

a second-1 transistor having a first electrode connected to the first control node, a gate electrode connected to the second control node, a back gate electrode for receiving a carry signal from a next signal transmission unit, and a second electrode connected to a buffer node; and a second-2 transistor having a first electrode connected to the buffer node, a gate electrode connected to the second control node, a back gate electrode for receiving the carry signal from the next signal transmission unit, and a second electrode connected to a low potential voltage line, and wherein the second-1 and second-2 transistors are configured to receive a carry signal of a gate low voltage from the next signal transmission unit to the respective back gate electrode while being turned off as the second control node is discharged.

15. The display device of claim 14, wherein the second-1 and second-2 transistors are configured to be turned on by a charging voltage of the second control node to discharge the first control node to a low potential voltage.

16. The display device of claim 14, wherein the second Q logic generator further includes:

a second-3 transistor having a first electrode connected to the first control node, a gate electrode for receiving a start signal, and a second electrode connected to the buffer node; and a second-4 transistor having a first electrode connected to the buffer node, a gate electrode for receiving the start signal, and a second electrode connected to the low potential voltage line.

17. The display device of claim 16, wherein the first Q logic generator includes:

a first-1 transistor having a first electrode and a gate electrode for receiving the carry signal from the previous signal transmission unit, and a second electrode connected to the buffer node;

a first-2 transistor having a first electrode connected to the buffer node, a gate electrode for receiving the carry signal from the previous signal transmission unit, and a second electrode connected to the first control node; and a first-3 transistor having a first electrode connected to a high potential voltage line to which a high potential voltage is for being applied, a gate electrode connected to the first control node, and a second electrode connected to the buffer node.

18. The display device of claim 14, wherein the second circuit unit includes an inverter circuit which is configured to invert a voltage of the first control node and apply the inverted voltage to the second control node.

19. The display device of claim 18, wherein the inverter circuit includes a first Qb logic generator and a second Qb logic generator, wherein the first Qb logic generator includes a fourth transistor having a first electrode connected to a high potential voltage line, a gate electrode connected to a first node, and a second electrode connected to the second control node; and a fourth-1 transistor having a first electrode connected to the high potential voltage line, a gate electrode connected to the second control node of the previous signal transmission unit, and a second electrode connected to the first node, and wherein the second Qb logic generator includes a fourth-q transistor having a first electrode connected to the first node, a gate electrode connected to the buffer node, and a second electrode connected to the second control node; and a fifth-q transistor having a first electrode connected to the second control node, a gate electrode connected to the buffer node, and a second electrode connected to the low potential voltage line.

20. The display device of claim 19, wherein the first Qb logic generator further includes a capacitor connected between the gate electrode and the second electrode of the fourth transistor.

21. The display device of claim 14, wherein all transistors in the display panel including the data driver, the gate driver, and the sub-pixels are implemented with oxide thin film transistors (TFTs) including an n-channel type oxide semiconductor.

22. A display device comprising:

a display panel on which a plurality of data lines, a plurality of gate lines crossing the data lines, a plurality of power lines to which different constant voltages are for being applied, and a plurality of sub-pixels are disposed;

a data driver configured to supply a data voltage of pixel data to the data lines; and a gate driver configured to supply a gate signal to the gate lines, wherein the gate driver includes a plurality of signal transmission units cascade-connected via a carry line to which a carry signal is for being applied from a prior signal transmission unit, wherein an nth (n is a positive integer) signal transmission unit includes:

a circuit unit configured to receive the carry signal from the prior signal transmission unit to charge or discharge voltages of a first control node and a second control node; and an output unit configured to output a gate signal and a carry signal based on potentials of the first control node and the second control node, wherein the output unit includes:

a first pull-up transistor having a first electrode connected to a first high potential voltage line, a gate electrode connected to the first control node, and a second electrode connected to a first output node;

a first pull-down transistor having a first electrode connected to the first output node, a gate electrode connected to the second control node, a back gate electrode for receiving a carry signal from a previous signal transmission unit, and a second electrode connected to a first low potential voltage line;

a second pull-up transistor having a first electrode connected to a second high potential voltage line, a gate electrode connected to the first control node, and a second electrode connected to a second output node; and a second pull-down transistor having a first electrode connected to the second output node, a gate electrode connected to the second control node, a back gate electrode for receiving the carry signal from the previous signal transmission unit, and a second electrode connected to a second low potential voltage line, and wherein the first and second pull-down transistors are configured to receive a carry signal of a gate low voltage from the previous signal transmission unit to the respective back gate electrode while being turned off as the second control node is discharged.

23. The display device of claim 22, wherein the first and second pull-down transistors are configured to be turned on by a charging voltage of the second control node to discharge the first output node to a low potential voltage.

* * * * *